(12) United States Patent
McCann et al.

(10) Patent No.: US 7,035,239 B2
(45) Date of Patent: *Apr. 25, 2006

(54) METHODS AND SYSTEMS FOR ROUTING MESSAGES IN A COMMUNICATIONS NETWORK

(75) Inventors: Thomas Matthew McCann, Morrisville, NC (US); Raghavendra Gopala Rao, Cary, NC (US); Robert Fulton West, Jr., Raleigh, NC (US)

(73) Assignee: Tekelec, Calabasas, CA (US)

( * ) Notice: Subject to any disclaimer, the term of this patent is extended or adjusted under 35 U.S.C. 154(b) by 729 days.

This patent is subject to a terminal disclaimer.

(21) Appl. No.: 09/747,070

(22) Filed: Dec. 22, 2000

(65) Prior Publication Data

US 2001/0030957 A1 Oct. 18, 2001

Related U.S. Application Data

(63) Continuation-in-part of application No. 09/471,946, filed on Dec. 23, 1999.

(51) Int. Cl.
*H04B 7/216* (2006.01)
*H04L 12/66* (2006.01)

(52) U.S. Cl. ............... 370/335; 370/342; 370/352; 370/392; 370/410

(58) Field of Classification Search ........ 370/352–356, 370/389, 392, 400–401, 410, 522, 335, 342, 370/428; 455/426–433, 445, 466; 379/221.14
See application file for complete search history.

(56) References Cited

U.S. PATENT DOCUMENTS 4,310,727 A 1/1982 Lawser
4,754,479 A 6/1988 Bicknell et al.
5,237,604 A 8/1993 Ryan (Continued)

FOREIGN PATENT DOCUMENTS

EP 0 512 962 A2 11/1992

(Continued)

OTHER PUBLICATIONS

Anonymous, "Zeichengabesysteme-Eine neue Generation für ISDN und intelligente Netze," Zeichengabesystem, Medien-Institut Bremen, p. ix-xi; 170-176, (Feb. 17, 1995).

(Continued)

*Primary Examiner*—Seema S. Rao
*Assistant Examiner*—Melanie Jagannathan
(74) *Attorney, Agent, or Firm*—Jenkins, Wilson & Taylor, P.A.

(57) ABSTRACT

A flexible routing node for re-directing signaling messages in a communications network is disclosed. Re-direction or re-routing of signaling message packets is accomplished through the use of a range or block-based database in conjunction with an exception-based database. The range-based routing instruction databases incorporates a data structure that maps ranges or blocks of mobile identification numbers (MINs) to a single destination network address, while the exceptions database stores any exceptions to these range or block-based rules. The pair of routing databases is implemented such that, when a signaling message is received that requires re-direction, the exception-based database is queried first. If a match is found in the exceptions database, the signaling message is modified using the returned routing instructions and transmitted into an associated communication network. If no match is found in the exception-based database, a default query is performed against the range-based database. The signaling message is then modified using the routing instructions returned by the range-based database and transmitted into an associated communication network.

25 Claims, 12 Drawing Sheets

U.S. PATENT DOCUMENTS

| | | | |
|---|---|---|---|
| 5,247,571 | A | 9/1993 | Kay et al. |
| 5,251,248 | A | 10/1993 | Tokunaga et al. |
| 5,400,390 | A | 3/1995 | Salin |
| 5,422,941 | A | 6/1995 | Hasenauer et al. |
| 5,423,068 | A | 6/1995 | Hecker |
| 5,442,683 | A | 8/1995 | Hoogeveen |
| 5,455,855 | A | 10/1995 | Hokari |
| 5,457,736 | A | 10/1995 | Cain et al. |
| 5,481,603 | A | 1/1996 | Gutierrez et al. |
| 5,504,804 | A | 4/1996 | Widmark et al. |
| 5,526,400 | A | 6/1996 | Nguyen |
| 5,579,372 | A | 11/1996 | Astrom |
| 5,590,398 | A | 12/1996 | Matthews |
| 5,594,942 | A | 1/1997 | Antic et al. |
| 5,623,532 | A | 4/1997 | Houde et al. |
| 5,689,548 | A | 11/1997 | Maupin et al. |
| 5,706,286 | A | 1/1998 | Reiman et al. |
| 5,711,002 | A | 1/1998 | Foti |
| 5,832,382 | A | 11/1998 | Alperovich |
| 5,854,982 | A | 12/1998 | Chambers et al. |
| 5,878,347 | A | 3/1999 | Joensuu et al. |
| 5,890,063 | A | 3/1999 | Mills |
| 5,953,662 | A | 9/1999 | Lindquist et al. |
| 5,953,663 | A | 9/1999 | Maupin et al. |
| 6,006,098 | A | 12/1999 | Rathnasabapathy et al. |
| 6,097,960 | A | 8/2000 | Rathnasabapathy et al. |
| 6,115,463 | A | 9/2000 | Coulombe et al. |
| H1895 | H | 10/2000 | Hoffpauir et al. |
| 6,128,377 | A | 10/2000 | Sonnenberg |
| 6,138,016 | A * | 10/2000 | Kulkarni et al. ............ 455/433 |
| 6,138,017 | A * | 10/2000 | Price et al. ................. 455/433 |
| 6,138,023 | A | 10/2000 | Agarwal et al. |
| 6,144,857 | A | 11/2000 | Price et al. |
| 6,148,204 | A | 11/2000 | Urs et al. |
| 6,192,242 | B1 | 2/2001 | Rollender |
| 6,226,517 | B1 | 5/2001 | Britt et al. |
| 6,263,212 | B1 * | 7/2001 | Ross et al. .................. 455/466 |
| 6,308,075 | B1 * | 10/2001 | Irten et al. .................. 455/466 |
| 6,424,832 | B1 | 7/2002 | Britt et al. |

FOREIGN PATENT DOCUMENTS

| | | |
|---|---|---|
| EP | 0 944 276 A1 | 9/1999 |
| WO | WO 95/12292 A1 | 5/1995 |
| WO | WO96/11557 | 4/1996 |
| WO | WO 97/33441 A1 | 9/1997 |
| WO | WO 99/11087 A2 | 3/1999 |
| WO | WO 00/16583 A1 | 3/2000 |

OTHER PUBLICATIONS

Official Action from European Patent Office in counterpart European Patent Application (Dec. 11, 2003).

"Cisco IP Transfer Point as the Signaling Gateway for the Cisco BTS 10200 Softswitch," Cisco Systems, Inc., pp. 1-10 (Summer 2004).

"Cisco IP Transfer Point as the Signaling Gateway for the Cisco PGW 2200 Softswitch," Cisco Systems, Inc., pp. 1-11 (Summer 2004).

"Next-Generation Signaling Transports Cisco IP Transfer Point," Cisco Systems, Inc., pp. 1-27 (Summer 2004).

"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).

Walker, "The IP Revolution in Mobile Messaging," PACKET, Cisco Systems Users Magazine, vol. 16, No. 1, pp. Cover; 73-74; and 89 (First Quarter 2004).

"Cisco ITP Multilayer Routing (MLR) SMS MO Routing Requirements," Cisco Systems, Inc., p. 1 (Copyright 2004).

"Cisco Signaling Gateway Manager Release 3.2 For Cisco IP Transfer Point," Cisco Systems, Inc., pp. 1-9 (Copyright 1992-2004).

"Solutions for Mobile Network Operators," Cisco Systems, Inc., pp. 1-8 (Copyright 1992-2004).

Moodie, "Agilent acceSS7: White Paper," Agilent Technologies, pp. 1-14 (Apr. 1, 2003).

"Cisco IP Transfer Point," Cisco Systems, Inc., pp. 1-10 (Copyright 1992-2003).

"Cisco IP Transfer Point Multilayer Short Message Service Routing Solution," Cisco Systems, Inc., pp. 1-6 (Copyright 1992-2003).

"Cisco ITP MAP Gateway for Public WLAN SIM Authentication and Authorization," Cisco Systems, Inc., pp. 1-13 (Copyright 1992-2003).

Barry, "A Signal for Savings," PACKET, Cisco Systems Users Magazine, vol. 14, No. 4, pp. Cover; 19-21; and 81 (Fourth Quarter 2002).

"Agilent Technologies and Cisco Systems SS7 over IP White Paper," Cisco Systems, Inc. and Agilent and Technologies, pp. 1-6 (Copyright 2002—Printed in the UK Feb. 1, 2002).

"Cisco IP Transfer Point: MTP3 User Adaptation (M3UA) and SCCP User Adaptation (SUA) Signaling Gateway," Cisco Systems, Inc., pp. 1-14 (Copyright 2002).

"Cisco SS7 Port Adapter for the Cisco 7500 Versatile Interface Processor and 7200 VXR Routers Provide High-Density SS7 Aggregation," Cisco Systems, Inc., pp. 1-5 (Copyright 1992-2002).

"Next-Generation SS7 Networks with the Cisco IP Transfer Point," Cisco Systems, Inc., pp. 1-14 (Copyright 1992-2002).

"Agilent acceSS7 Business Intelligence," Agilent Technologies, pp. 1-6 (Copyright 2001—Printed in the UK Nov. 30, 2001).

"Cisco IP Transfer Point (ITP) Network Management Product Presentation," Cisco Systems, Inc., pp. 1-20 (Copyright 2001).

"Networkers," Cisco Systems, Inc., pp. 1-60 (Copyright 2001).

"Cisco SS7 Signaling Offload," Cisco Systems, Inc., pp. 1-33 (Copyright 1992-2001).

"Topsail Beach—SS7 Over IP—" Cisco Systems, Inc., pp. 1-16 (Copyright 1999).

"Chapter 1: Overview," SS7 Port Adapter Installation and Configuration, pp. 1-1—1-8 (Publication Date Unknown).

"Configuring ITP Basic Functionally," IP Transfer Point, Cisco IOS Release 12.2(4)MB12, pp. 31-50 (Publication Date Unknown).

"Configuring ITP Optional Features," IP Transfer Point, Cisco IOS Release 12.2(4)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)MB10, pp. 49-62 (Publication Date Unknown).

Rockhold, "Or," Wireless Review, p. 22, 23, 26, 28, 30, 32, (Aug. 15, 2000).

ETSI, "Digital Cellular Telecommunications Systems (Phase 2+); Support of Mobile Number Portability (MNP); Technical Realisation; Stage 2," Global System for Mobile Communications, p. 1-71, (1998).

Smith, "Number Portability Pileup," Telephony, p. 22, 24, 26, (Jan. 6, 1997).

Jain et al., "Phone Number Portability for PCS Systems with ATM Backbones Using Distributed Dynamic Hashing," IEEE, vol. 15 (No. 1), p. 96-105, (Jan., 1997).

Heinmiller, "Generic Requirements for SCP Application and GTT Function for Number Portability," Illinois Number Portability Workshop, p. 1-50, (Sep. 4, 1996).

International Telecommuniation Union, "Series Q: Switching and Signalling: Specifications of Signalling System No. 7—Signalling Connection Control Part," p. 11-16, (Jul., 1996).

Rice, "SS7 Networks in a PCS World," Telephony, pp. 138, 140, 142, 144, 146, (Jun. 24, 1996).

Tekelec, "Eagle STP Planning Guide", Eagle Network Switching Division, (No. 3), p. i-vii, 1-64, A1-A2, B1-2, (May 1996).

Anonymous, "Generic Switching and Signaling Requirements for Number Portability," AT&T Network Systems, No. 1, p. 1-75, (Feb. 2, 1996).

ETSI, Digital Cellular Telecommunications System (Phase 2+); Mobile Application Part (MAP) Specification, Global System for Mobile Communications, pp. 112-114 (1996).

Jain, et al., "A Hashing Scheme for Phone Number Portability in PCS Systems with ATM Backbones," Bell Communications Research, p. 593-597, (1996).

Bishop, "Freeing the Network for Competition," Telecommunicatins, p. 75-80, (Apr., 1995).

Giordano et al., "PCS Number Portability," IEEE, p. 1146-1150, (Sep., 1994).

Bellcore, "Signaling Transfer Point (STP) Generic Requirements," Bell Communications Research, No. 1, p. ii-xxii, 4-84-J14, (Jun., 1994).

Telcordia Technologies, "CCS Network Itnerface Specification (CCSNIS) Supporting SCCP and TCAP," Bell Communications Research, p. ii-xii, 1-1—3-6, A-1—C-22, (Mar., 1994).

Buckles, "Very High Capacity Signaling Transfer Point for Intelligent Network Services," DSC Communications Corporation, p. 1308-1311, (1988).

* cited by examiner

G-FLEX DATABASE — 330

| KEY | | DATA FIELDS | | | | |
|---|---|---|---|---|---|---|
| MIN | Entity | PC | SSN | RI | RCGT | ENTITY ADDRESS |
| 9193803833 | HLR | 3-0-3 | 6 | RT-ON-SSN | NO | 3033211234 (HLRC) |
| 2123675637 | HLR | 3-0-2 | 6 | RT-ON-SSN | NO | 2023211234 (HLRB) |
| 7704545731 | HLR | 3-0-3 | 6 | RT-ON-SSN | NO | 3033211234 (HLRC) |
| 2125662322 | HLR | 4-0-0 | -- | RT-ON-GT | YES | 1013211234 (HLRA) |
| 4143286672 | SMSC | 6-0-1 | -- | RT-ON-GT | YES | 4146773497 (SMSCB) |

Figure 9a

GTT DATABASE — 332

| KEY FIELDS | | DATA FIELDS | | |
|---|---|---|---|---|
| MINIMUM MIN | MAXIMUM MIN | PC | SSN | RI |
| 9199670000 | 9199679999 | 3-0-2 | 6 | RT-ON-SSN |
| 7707880000 | 7707889999 | 3-0-2 | 6 | RT-ON-SSN |
| 9199699000 | 9199699999 | 3-0-3 | 6 | RT-ON-SSN |

Figure 9b

| PARAM. | ORIGINAL | TRANSLTD |
|---|---|---|
| OPC | 1-0-0 | 2-0-0 |
| DPC | 2-0-0 | 3-0-3 |
| CGPA | 1-0-0:7 | 1-0-0:7 |
| CDPA:SSN | 6 | 6 |
| CDPA:GTD | 9193803833 | 9193803833 |
| CDPA:TT | 0 | 0 |
| CDPA:GTI | 4 | 4 |
| CDPA:NP | E.164 | E.164 |
| CDPA:NAI | NATIONAL | NATIONAL |
| CDPA: RI | RT-ON-GT | RT-ON-SSN |

Figure 10a

| PARAM. | ORIGINAL | TRANSLTD |
|---|---|---|
| OPC | 1-0-0 | 2-0-0 |
| DPC | 2-0-0 | 3-0-2 |
| CGPA | 1-0-0:7 | 1-0-0:7 |
| CDPA:SSN | 6 | 6 |
| CDPA:GTD | 7707883438 | 7707883438 |
| CDPA:TT | 0 | 0 |
| CDPA:GTI | 4 | 4 |
| CDPA:NP | E.164 | E.164 |
| CDPA:NAI | NATIONAL | NATIONAL |
| CDPA: RI | RT-ON-GT | RT-ON-SSN |

Figure 10b

| PARAM. | RECVD | TRANSLTD |
|---|---|---|
| OPC | 4-0-0 | 2-0-0 |
| DPC | 2-0-0 | 4-0-0 |
| CGPA | 1-0-0:7 | 1-0-0:7 |
| CDPA:SSN | 6 | 6 |
| CDPA:GTD | 2125662322 | 1013211234 |
| CDPA:TT | 0 | 0 |
| CDPA:GTI | 4 | 4 |
| CDPA:NP | E.164 | E.164 |
| CDPA:NAI | NATIONAL | NATIONAL |
| CDPA: RI | RT-ON-GT | RT-ON-GT |

Figure 10c

METHODS AND SYSTEMS FOR ROUTING MESSAGES IN A COMMUNICATIONS NETWORK

RELATED APPLICATION INFORMATION

This application is a continuation-in-part of U.S. patent application Ser. No. 09/471,946 filed Dec. 23, 1999, the disclosure of which is incorporated herein by reference in its entirety.

TECHNICAL FIELD

The present invention relates to the routing of signaling messages in a communications network, and, more particularly, to methods and systems for providing a switching node that incorporates flexible message routing functionality.

BACKGROUND ART

Within the global wireless telecommunications industry, the current trend in network technology is divided between Global System for Mobile Communications (GSM) and American National Standards Institute (ANSI)-41 based architectures. In many respects, GSM and ANSI-41 based networks are quite similar, with the primary differences between the two technologies simply relating to the protocols used to communicate between the various network entities, and the operating frequencies of the communication handsets themselves. As such, in the interest of clarity, discussions of the present invention will henceforth be limited to GSM type network implementations. However, it should be appreciated that the present invention could be similarly practiced in an ANSI-41, Personal Communication Services (PCS) or similar type network.

A typical GSM network architecture is illustrated in FIG. 1. As shown in FIG. 1, the typical GSM network, generally indicated by the numeral 100, incorporates a number of functional elements or nodes which are appropriately interconnected so as to obtain the desired overall network service. These network nodes include a Home Location Register (HLR) 116, a Visitor Location Register (VLR) 118, an Equipment Identification Register (EIR) 120, an Authentication Center (AuC) 122, a Mobile Switching Center (MSC) 110, a Gateway Mobile Switching Center (GMSC) 112, an Inter-Working Mobile Switching Center (IWMSC) 132, and a Short Message Service Center (SMSC) 130. Briefly, the HLR 116 is a database that is used to store subscriber information for all customers within the home service area of the GSM service provider. Functionally, the HLR 116 is linked through a signaling network to other service areas such that subscriber information may be efficiently shared between geographically diverse networks, a characteristic that facilitates seamless inter-network roaming. Like HLR 116, the VLR 118 is also a database that contains subscriber information. However, the VLR 118 is specifically used to store information related to subscribers who are not in their home service area. More particularly, the VLR 118 is where roaming related data for a customer is stored when the customer activates their handset outside of their designated home service area. The EIR node 120 retains information related to the identification serial numbers of all customer handsets that have been activated within the service area, while the AuC node 122 contains security or encryption key data associated with each of the handsets. SMSC 130 serves primarily as a store-and-forward mechanism for subscribers to send Short Message Service (SMS) messages to other mobile subscribers or computer systems.

The five network elements described above (HLR, VLR, EIR, AuC, SMSC) can be thought of as essentially databases or database processing nodes. Unlike these database nodes, the MSC 110, GMSC 112, and IWMSC 132 are generally identified as network switching elements. Among their many functions, the MSC 110 and GMSC 112 are responsible for determining which cell site will take possession of a call. Such hand off control is facilitated by a communication link between the MSC 110 and an associated Base Station Controller (BSC)/Base Transceiver Station (BTS) pair 124. A Tx/Rx cell site 126 may be associated with each BTS/BSC pair 124. The GMSC 112 has the added distinction of providing a gateway interface to the Public Switched Telephone Network (PSTN) 114; otherwise, MSC 110 and GMSC 112 functionality is very similar. Furthermore, as generally illustrated in FIG. 1, the GMSC 112 is also coupled via signaling links to the four database nodes described above, and as such, all signaling message access to these database nodes is controlled and administered by the GMSC. Although not illustrated in FIG. 1, the MSC may also be coupled directly to the database nodes. IWMSC 132 is typically an MSC 110 or a GMSC 112 that also has the function of inter-working between the SMSC 130 and the rest of the mobile network.

Of particular relevance to the present invention are the signaling aspects of the GSM network described above, especially those aspects associated with the signaling interactions between an HLR or SMSC database node and an MSC or GMSC type node. In order to better understand these signaling interactions, a more detailed explanation of HLR operation is provided below.

Within a GSM wireless communication network, each mobile station handset 128 is assigned a unique identification number known as an International Mobile Subscriber Identity (IMSI) identification number. In the case of European GSM—type network implementations, the IMSI code is typically associated with a particular telephone handset. In such networks, each user can also be assigned one or more Mobile Station Integrated Services Digital Network (MSISDN) numbers. In the wireless telecommunications industry, MSISDN numbers are analogous to the 10 digit telephone numbers in a conventional North American wired network. The fact that multiple MSISDN numbers can be associated with a single IMSI number, indicates that more than one MSISDN number can be assigned and used to reach a single mobile station handset. It should be appreciated that in this disclosure, the term "Mobile Identification Number" (MIN) is used generically to refer to IMSI, MSISDN, Mobile Global Title, ANSI-41 Mobile Identification Numbers (MIN) and Mobile Directory Numbers (MDN), and other identification numbers associated with subscribers or services in a wireless communication network.

In any event, an MSISDN number is dialed whenever a user wants to communicate with a particular mobile station handset. An MSC or GMSC, by analyzing a part of the dialed MSISDN number, determines the particular HLR that is storing routing information associated with the called mobile station. By retrieving and utilizing such routing information, the GSM network is able to locate the called mobile station in response to a call attempt so that a call connection can be established between the calling party and the called mobile station. It should also be appreciated that, depending on the nature of the call or signaling event, an MSC may alternatively analyze and perform the HLR lookup based on the IMSI or MSISDN number associated with the called or calling party.

FIG. 2 illustrates a typical GSM network architecture, generally indicated by the numeral 150, which includes a GMSC 154 that is linked to both an MSC 152 and a single HLR unit 156. GMSC 154 includes a routing table 160, while HLR 156 includes a database table 158. FIG. 3 also illustrates a typical GSM network architecture, generally indicated by the numeral 180, which includes a GMSC 182 linked to several HLR units. More particularly, GMSC 182 is coupled via signaling links to HLR A 186, HLR B 190, and HLR C 194, and necessarily to HLR database tables 188, 192, and 196, respectively. In both FIGS. 2 and 3. GMSCs 154 and 182 may be connected to SS7 network 162

In the examples illustrated in both FIGS. 2 and 3, each of the HLRs is configured to service a pre-defined block of subscriber MSISDN numbers. In general, a specific series or block of MSISDN (or IMSI) numbers are pre-assigned to each HLR in a service provider's network. It should be appreciated that the HLR database and GMSC Routing Table structures shown in FIGS. 2–3 are merely illustrative of the high level information storage concept and are not intended to represent the actual data structures that would typically be implemented in such network nodes. In many cases, service providers are not able to alter these blocks of assigned numbers within a given HLR unit because of routing limitations of the MSC associated with the HLR unit. Consequently, service providers have no opportunity to dynamically re-allocate their MSISDN number base across multiple HLRs, so as to more efficiently utilize existing HLR resources (i.e., load sharing). It should be noted that this limitation is typically the result of routing table restrictions in the MSCs, and generally not database storage restrictions in the HLRs. That is, although HLRs can generally be populated so as to contain subscriber data entries for any IMSI or MSISDN number, MSCs are typically only capable of routing messages based on an IMSI or MSISDN block in which the message's IMSI or MSISDN number falls. These IMSI or MSISDN blocks are comprised of a sequential range of IMSI or MSISDN numbers. Thus, it is the limited routing capability of an MSC or a GMSC that causes the problem, and typically not the HLR nodes.

For instance, in FIG. 2, all traffic relating to calls associated with an MSISDN number between 9199670000 and 9199679999 will be routed to HLR A 156 by the associated GMSC 154. As the service provider begins to acquire more and more customers (i.e., assigning more and more of the MSISDN numbers in the allocated block or series 9199670000 to 9199679999), the traffic or congestion experienced at the HLR A 156 node will increase accordingly.

Now consider that a service provider owning the network elements illustrated in FIG. 2 has acquired so many new customers that it is decided to invest in an additional pair of HLRs. This scenario is generally illustrated in FIG. 3, where the two additional HLRs are identified as HLR B 190 and HLR C 194. At the time of implementation HLR B 190 is populated with MSISDN number block 919968000–9199689999, and HLR C 194 is populated with MSISDN number block 9199690000–9199699999. These two HLRs are linked to the adjacent GMSC 182 and activated so as to service any calls corresponding to their pre-programmed MSISDN blocks.

The major shortcoming of such multiple HLR configurations can now be more fully appreciated. As generally indicated in FIG. 3, despite the addition of the new HLR resource capacity represented by units B and C, all call traffic associated with MSISDN numbers 9199670000–9199679999 must still be handled by a single HLR, HLR A 188. Even if the service provider has no customers within the MSISDN 9199680000–9199699999 number range, it is not possible for the service provider to dynamically re-allocate or re-distribute the "fully assigned" 9199670000–9199679999 MSISDN number block among the unused HLR B 192 and HLR C 196 units. Thus, it is quite possible that the service provider will operate in a situation where traffic to HLR A 188 is highly congested, while the HLR B 192 and HLR C 196 resources are completely unused. This can lead to less than efficient usage of installed resources, as it would be more efficient to load balance or share traffic more equally among the three HLR units.

It should be appreciated that, in addition to the load sharing concerns, there are similar issues and similar needs that arise when considering the porting of subscribers from one service provider to another, otherwise known as local number portability (LNP). Once again, the central problem is the ability to freely distribute subscriber information among multiple HLR nodes. A detailed discussion of the specific problems associated with LNP is not provided in this disclosure, as the high-level issues and concerns are the same as those for the load sharing scenario described herein.

U.S. Pat. No. 5,878,347 to Joensuu, et al., (hereinafter, "the '347 Patent") the disclosure of which is hereby incorporated by reference in its entirety, discloses one approach to solving some of the problems identified and discussed above. The solution described in the '347 Patent involves the implementation of a new network element, referred to as a virtual HLR (vHLR). FIG. 4 of the present application and the following description illustrates the function of the vHLR in the '347 patent. Referring to communication network 210 illustrated in FIG. 4, a vHLR node 214 is placed in the communication network pathway between a GMSC 212 and a plurality of HLR nodes, HLR A 218, HLR B 222, and HLR C 226. HLRs 218, 222, and 226 contain subscriber databases 220, 224, 228, respectively. The GMSC 212 sends signaling messages to the vHLR node 214 requesting subscriber information where the particular subscriber is associated with an IMSI or MSISDN type mobile station identification number. The vHLR 214 does not contain subscriber information; rather, the vHLR 214 contains a routing table 216 that correlates IMSI or MSISDN numbers with a particular HLR. More particularly, the routing table 216 contains information relating IMSI or MSISDN numbers to a corresponding network address associated with the HLR serving that IMSI or MSISDN subscriber.

The message routing technique disclosed by the '347Patent is a key element of the invention described therein. As generally illustrated in FIG. 4, a call originating from SS7 network 162 results in MSISDN=919969000 being communicated to GMSC 212. GMSC 212 originates a message 234 and sends the message to vHLR 214. When the vHLR node 214 receives a message 234 from the associated GMSC 212, the message is addressed to and is delivered directly to the vHLR node 214. The vHLR node 214 performs a table lookup, as described above, and re-routes the message to the appropriate HLR node, in this case HLR C 228. This re-routing function is accomplished by altering the destination point code (DPC) of the message 236 routing label, such that the original DPC (PC=vHLR) is replaced by a new DPC (PC=HLR C). It is significant, and should be noted that the vHLR node 214 does not alter the origination point code (OPC) of the message routing label. That is, the OPC of the incoming message 234 is the same as the OPC of the outgoing message 236, which is the point code of the GMSC 212. Thus, the message arrives at HLR C 228 with an OPC equal to the point code of GMSC node 212. HLR C 228 then responds with a message 238 that is addressed to the GMSC 212. The HLR C response message 238 is not routed back through the vHLR node 214.

While such a routing technique may save one or more routing "hops", from a network management perspective, this routing technique presents at least one significant problem. That is, in the event that an HLR should become unable to provide service, SS7 signaling convention requires that the HLR send a message to any signaling point (SP) that is attempting to communicate with it, alerting the SP to the impaired or out-of-service status of the HLR. Given the message flow described above, it will be appreciated that in such an out-of-service scenario, HLR C 226 would send a network management message to the originator of the incoming HLR C message 236. The originator of the incoming HLR C message 236 is identified by the OPC field of the message 236 routing label. As described above, the vHLR 214 node does not alter the OPC field of the routing label, but instead leaves the OPC set to the address of the GMSC 212. Thus, network management messages sent by HLR C 226 will be addressed to the GMSC 212. The problem with such a message routing scheme is that the GMSC 212 has no "knowledge" of having sent a message to HLR C 226. Once again, it will be appreciated that the DPC of the message 234 originally sent by the GMSC 212 was the network address of the vHLR 214. That is, the GMSC 212 has knowledge of a message sent to the vHLR 214, but no knowledge of a particular message destined for HLR C 226. Implementation of such an SS7 message routing scheme would therefore present a large problem for SS7 network operators that have purchased and deployed a large number of network elements that operate in compliance with industry standard SS7 communication protocols and network management procedures.

Therefore, what is needed is a novel system and method of redirecting signaling messages among multiple HLR, EIR, AuC and other similar signaling database type nodes, where message routing occurs in such a way as to preserve compliance with existing industry standard network management signaling protocols.

DISCLOSURE OF THE INVENTION

According to one aspect, the present invention includes a flexible routing node. The flexible routing node includes a communication module capable of transmitting and receiving data packets over a network. A range-based database contains range-based rule records indexed by blocks of identification numbers. An exceptions-based database contains exception-based rule records indexed by a single identification number. A database subsystem controller accesses at least one of the databases to extract routing information for the data packet. Because the flexible routing node includes both range- and exception based databases, flexibility in allocating mobile identification numbers among HLRs is increased.

Accordingly, it is an object of the present invention to provide a flexible routing node capable of performing both range- and exception-based database lookups.

It is another object of the present invention to provide a flexible routing node that complies with industry standard network management procedures.

Some of the objects of the invention having been stated hereinabove, other objects will become evident as the description proceeds, when taken in connection with the accompanying drawings as best described hereinbelow.

BRIEF DESCRIPTION OF THE DRAWINGS

FIG. 9a is a table which illustrates a sample G-FLEX™ database structure used in a preferred embodiment of a flexible routing node of the present invention.

FIG. 9b is a table which illustrates a sample GTT database structure used in a preferred embodiment of a flexible routing node of the present invention.

FIG. 10a is a table which illustrates partial content of a signaling message received and processed by a flexible routing node of the present invention in a first example scenario.

FIG. 10b is a table which illustrates partial content of a signaling message received and processed by a flexible routing node of the present invention in a second example scenario.

FIG. 10c is a table which illustrates partial content of a signaling message received and processed by a flexible routing node of the present invention in a third example scenario.

DETAILED DESCRIPTION OF THE INVENTION

Figure 1:
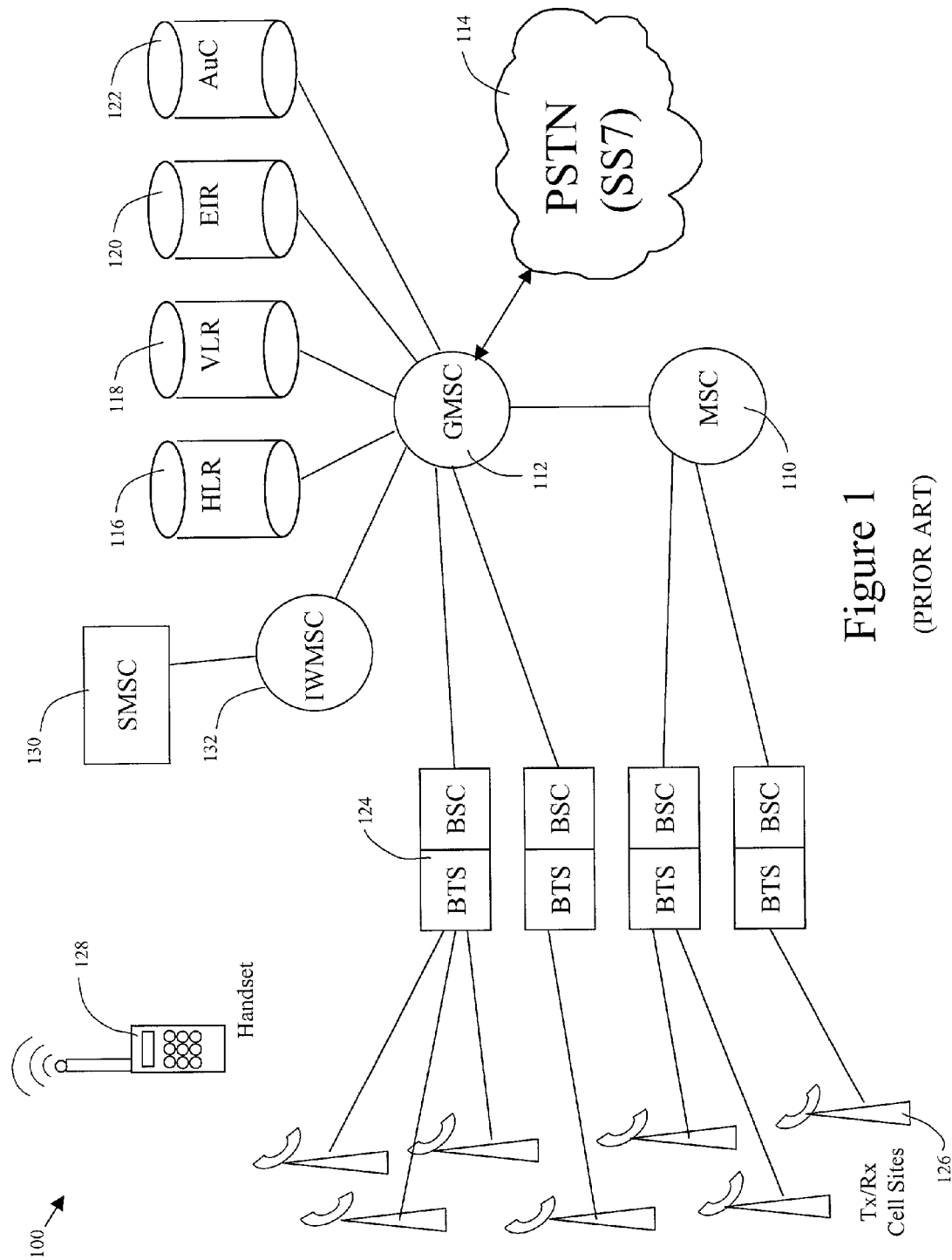
FIG. 1 is a network diagram illustrating a prior art GSM wireless telecommunication network architecture.
Figure 2:
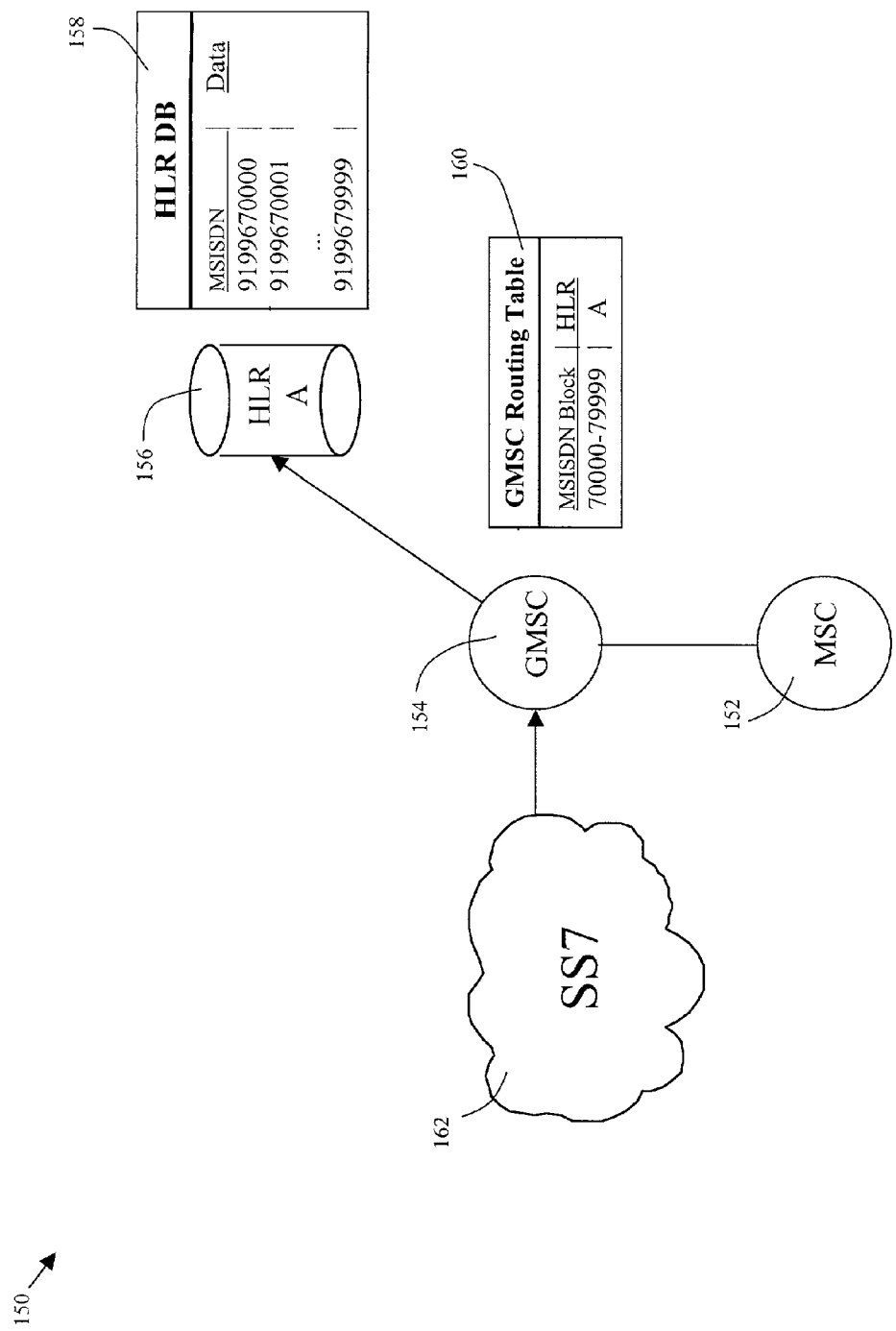
FIG. 2 is a network diagram illustrating a prior art GSM wireless telecommunication network implementation that includes a single HLR node.
Figure 3:
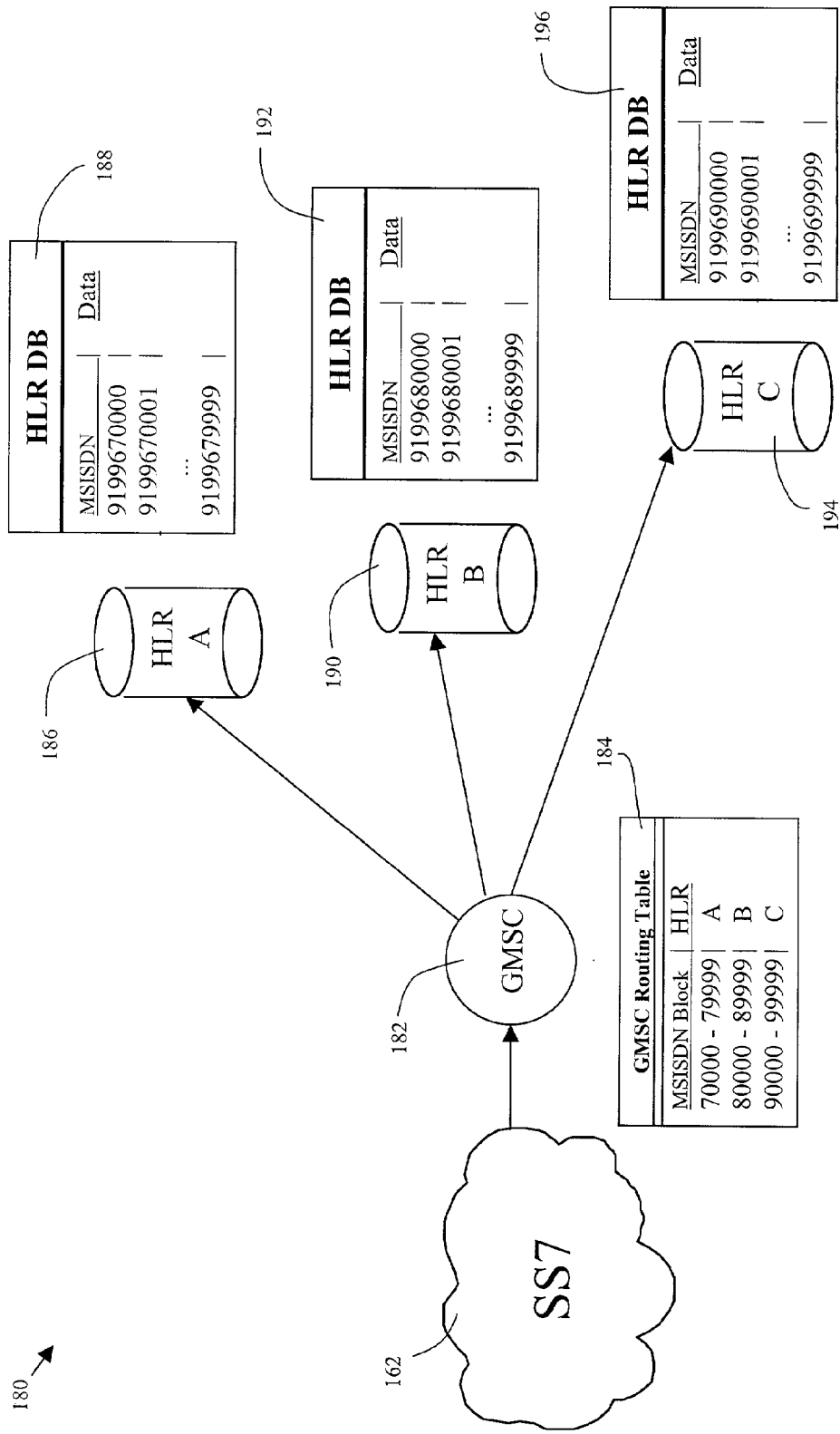
FIG. 3 is a network diagram illustrating a prior art GSM wireless telecommunication network implementation that includes multiple HLR nodes.
Figure 4:
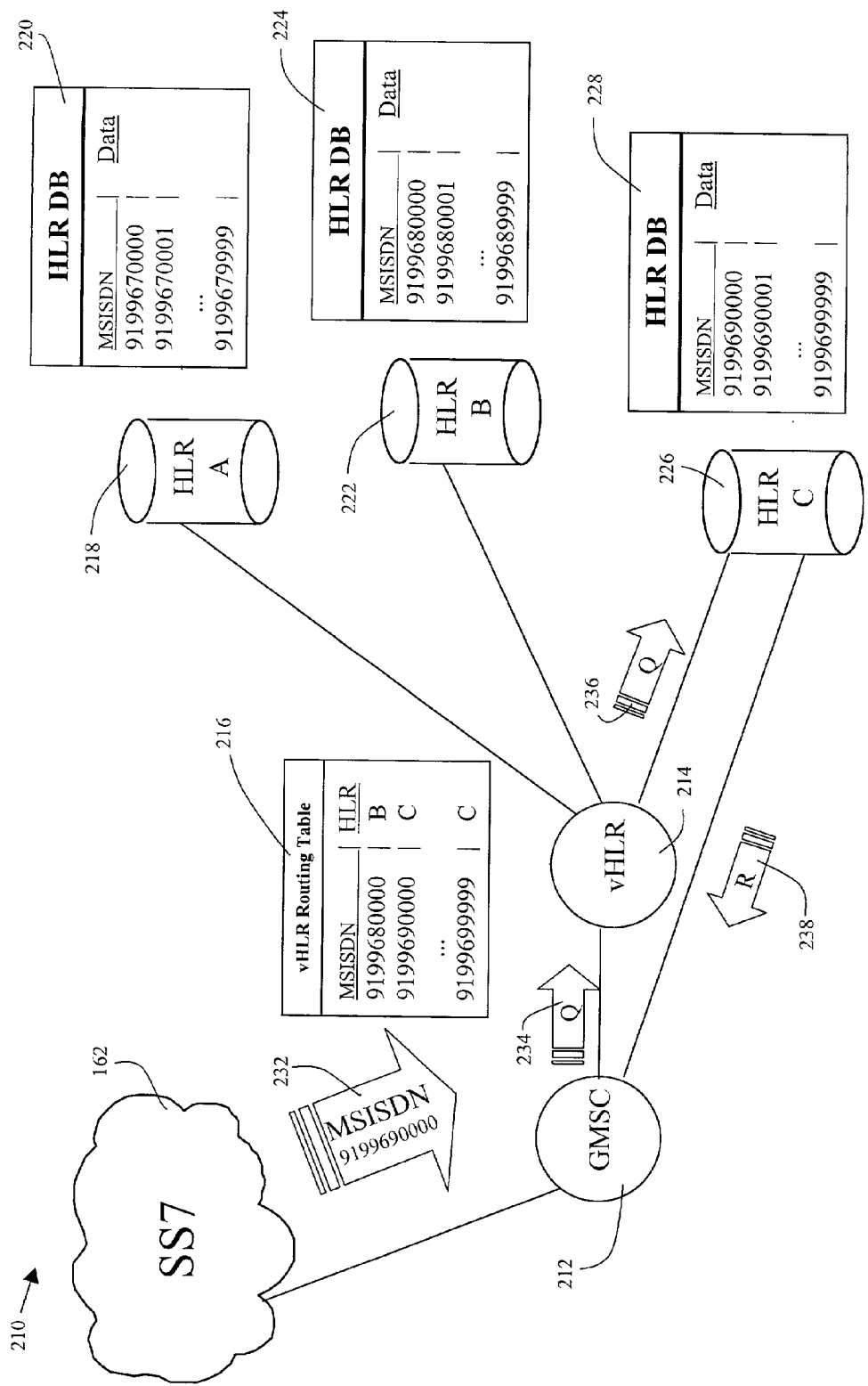
FIG. 4 is a network diagram illustrating a prior art GSM wireless telecommunication network architecture.
Figure 5:
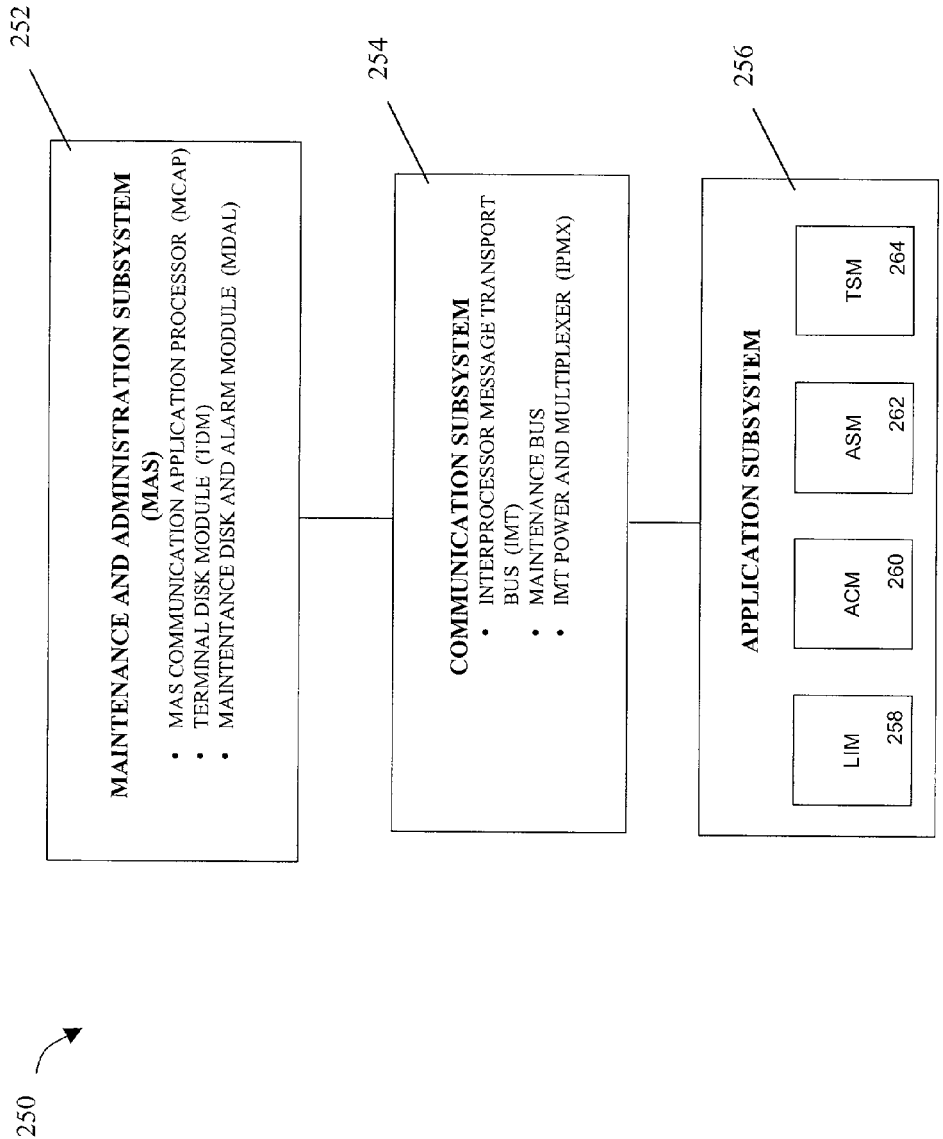
FIG. 5 is a schematic diagram of a prior art signal transfer point switching node.

According to one embodiment, the present invention includes a flexible routing node for communicating with a GMSC and HLRs or SMSCs in a network. In a preferred embodiment, a flexible routing node employs an internal architecture similar to that of a high performance STP that is marketed by the assignee of the present application as the EAGLE® STP. A block diagram of an EAGLE® STP is shown in FIG. 5. A detailed description of the EAGLE® STP may be found in the Eagle Feature Guide PN/9110-1225-01, Rev. B, January 1998, published by Tekelec, the disclosure of which is hereby incorporated herein by reference. As described in this publication, an EAGLE® STP 250 includes the following subsystems: a Maintenance and Administration Subsystem (MAS) 252, a communication subsystem 254 and an application subsystem 256. The MAS 252 provides maintenance communications, initial program load, peripheral services, alarm processing and system disks. The communication subsystem 254 includes an Interprocessor Message Transport (IMT) bus that is the main communication bus among all subsystems in the EAGLE® STP 250. This high speed communications system functions as two 125 Mbps counter-rotating serial buses.

The application subsystem 256 includes application cards that are capable of communicating with the other cards through the IMT buses. Numerous types of application cards can be incorporated into STP 250, including: a Link Interface Module (LIM) 258 that provides SS7 links and X.25 links, an Application Communication Module (ACM) 260 that provides a TCP/IP interface to an external monitoring device over Ethernet, and an Application Service Module (ASM) 262 that provides global title translation, gateway screening and other services. A Translation Service Module (TSM) 264 may also be provided for local number portability. A detailed description of the EAGLE® STP is provided in the above cited Feature Guide and need not be described in detail herein.

Figure 6:
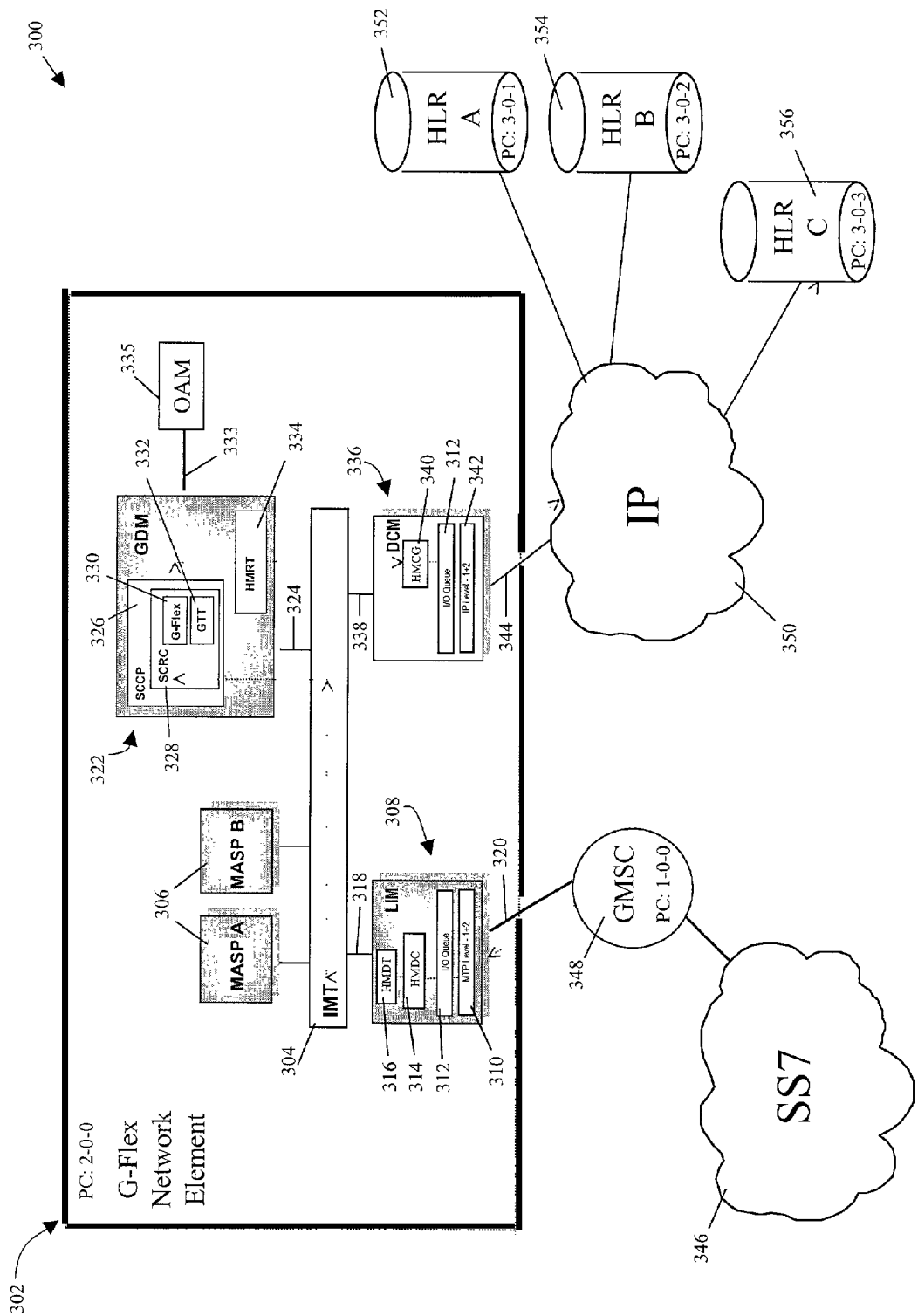
FIG. 6 is a schematic network diagram illustrating a first routing database access scenario according to a preferred embodiment of a flexible routing node of the present invention.

FIG. 6 is a schematic diagram of a simplified GSM network 300 including a flexible node 302 according to an embodiment of the present invention. In addition to the flexible routing node 302, GSM network 300 generally includes; an SS7 signaling network 346, a Gateway Mobile Switching Center (GMSC) 348, an Internet Protocol (IP) network 350, a first Home Location Register (HLR) 352, a second HLR 354, and a third HLR 356.

In the illustrated embodiment, flexible routing node 302 includes a high speed Interprocessor Message Transport (IMT) communications bus 304. Communicatively coupled to IMT bus 304 are a number of distributed processing modules or cards including: a pair of Maintenance and Administration Subsystem Processors (MASPs) 306, an SS7 enabled Link Interface Module (LIM) 308, an IP enabled Data Communication Module (DCM) 336, and a G-FLEX™ Database Module (GDM) 322. These modules are physically connected to the IMT bus 304 by bus interfaces 318, 324, and 338, respectively. For simplicity of illustration, only a single LIM 308, GDM 322, and DCM 336 are included in FIG. 6. However, it should be appreciated that the distributed, multi-processor architecture of the node 302 facilitates the deployment of multiple LIM, GDM, and DCM cards, all of which could be simultaneously connected to the IMT bus 304.

MASP pair 306 implements the maintenance and administration subsystem functions described above. As the MASP pair 306 is not particularly relevant to a discussion of the flexible routing attributes of the present invention, the reader is referred to the above-mentioned Tekelec EAGLE® publications for a more detailed description of these system components.

Focusing now on LIM card functionality, in the illustrated embodiment LIM 308 is comprised of a number of sub-components including, but not limited to: an SS7 MTP level 1 and 2 layer process 310, an I/O buffer or queue 312, an SS7 MTP level 3 layer HMDC process 314, and an HMDT process 316. MTP level 1 and 2 layer process 310 provides the facilities necessary to send and receive digital data over a particular physical media/physical interface, as well as to provide error detection/correction and sequenced delivery of all SS7 message packets. I/O queue 312 provides for temporary buffering of incoming and outgoing signaling message packets. MTP level 3 HMDC process 314 performs a discrimination function, effectively determining whether an incoming SS7 message packet requires internal processing or is simply to be through switched, i.e., routed to another node. The HMDT process 316 handles the internal routing of SS7 message packets that require additional processing prior to final routing.

In general, a GDM card provides the databases and database control processes necessary to perform the required network address translations to achieve the flexible routing functionality implemented by embodiments of the present invention. The GDM 322 shown in FIG. 6 is comprised, in part, of a Signaling Connection Control Part (SCCP) submodule 326, which further includes a database subsystem controller known as a Signaling Connection Routing Controller (SCRC) process 328. The SCRC process 328 is responsible for number conditioning, the directing of incoming SS7 message packets to either a G-FLEX™ database process 330 or a Global Title Translation (GTT) database process 332, and for modification of the message packets to include routing information returned by the G-FLEX™ or GTT database processes 330 and 332, respectively. SS7 message packets leaving SCRC process 328 are received and further processed by an HMRT process 334. The HMRT process 314 is responsible for the external routing of SS7 message packets that do not require additional processing by the flexible routing node 302. That is, the HMRT process 334 determines to which LIM or DCM card an SS7 message packet should be routed for subsequent outbound transmission. It will also be appreciated from FIG. 6 that GDM 322 is coupled to and serviced by an OAM subsystem 335 via an Ethernet connection 333. OAM subsystem 335 is responsible for administration and maintenance of the G-FLEX™ and GTT databases 330 and 332, respectively.

DCM 336, shown in FIG. 6, includes an HMCG process 340 which is responsible for monitoring congestion on the associated DCM linksets, and internally communicating this link congestion information to peer processes on other modules via the IMT bus 304. Such link congestion information is used by the HMRT process 334 during outbound link selection operations. It should be appreciated that outgoing SS7 message packets routed through the DCM 336 will be transmitted out of the flexible routing node 302 and into an Internet Protocol (IP) network 350. As the SS7 communication protocol and the IP communication protocol are not inherently compatible, all SS7 message packets that are to be sent into the IP network 350 are first encapsulated within an IP routing envelope prior to transmission. This IP encapsulation is performed by an IP encapsulation process 342. The IP encapsulation process 342 is the IP protocol equivalent of the SS7 MTP level 1–2 layer process 310 of the LIM module 308. Preferred packet formats for encapsulating various types of SS7 messages in IP packets is described in Internet Engineering Task Force (IETF) INTERNET DRAFT entitled Transport Adapter Layer Interface, May 28, 1999, the disclosure of which is incorporated herein by reference in its entirety.

Figure 7:
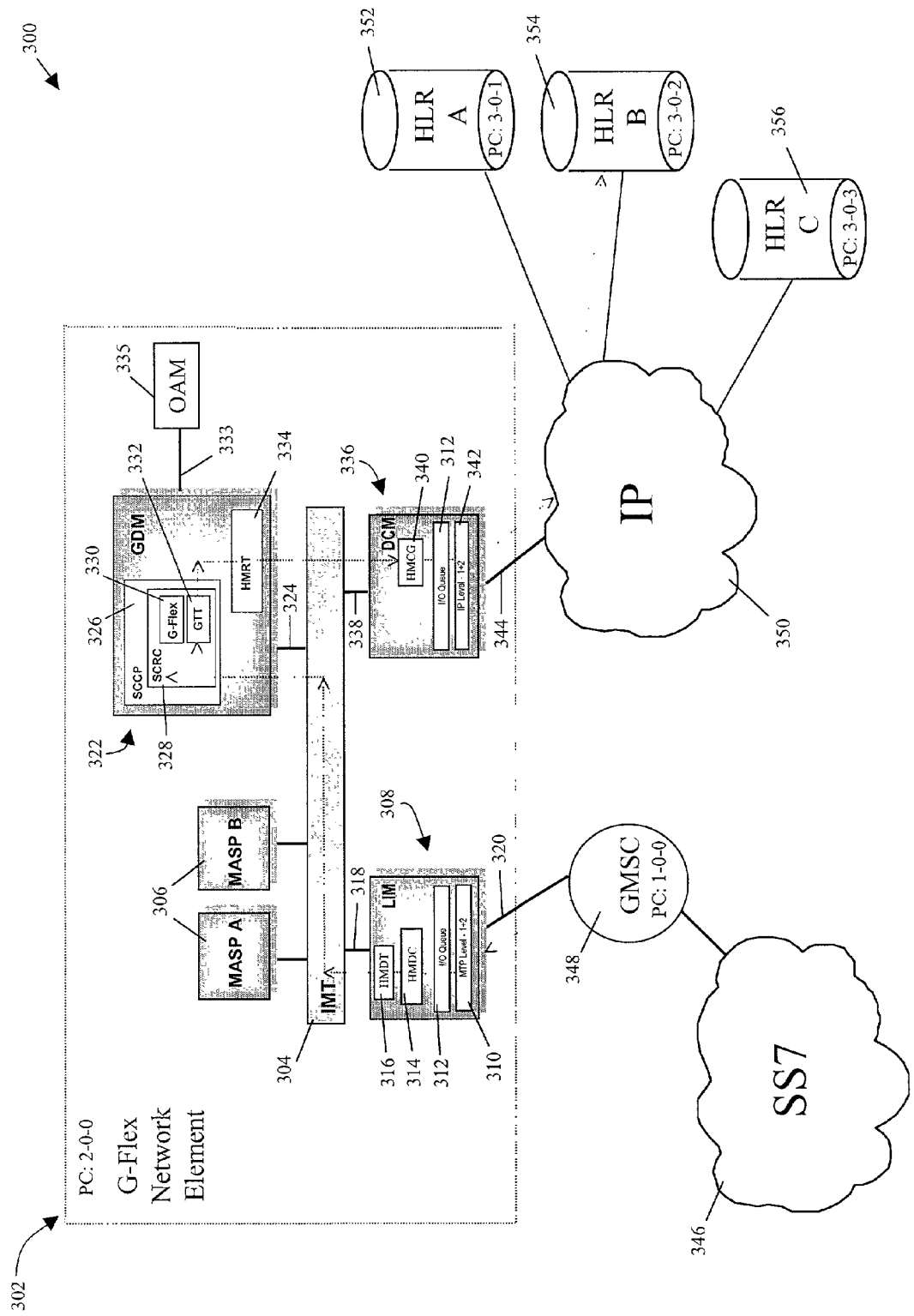
FIG. 7 is a schematic network diagram illustrating a second routing database access scenario according to a preferred embodiment of a flexible routing node of the present invention.

Once again, the description of LIM and DCM sub-components provided herein is limited to those sub-components that are relevant to the sample implementation scenarios illustrated in FIGS. 6 and 7. For a comprehensive discussion of additional LIM and DCM operations and functionality, the above-referenced Tekelec publications can be consulted.

With particular regard to the scenario illustrated in FIG. 6, the Gateway Mobile Switching Center 348 is communicatively coupled to the flexible routing node 302 via an SS7 communication link 320. More specifically, the GMSC node 348 is connected to LIM 308 via the SS7 communication link 320. Connected to the external IP network 350 is the DCM module 336, via an IP communication link 344. Residing within and connected to the IP network 350 are the HLR nodes 352, 354, and 356. As such, an IP communication pathway exists between the DCM module 336 of the flexible routing node 302 and each of the HLR nodes 352, 354, and 356. The IP communication pathway can be TCP/IP or UDP/IP. It should be appreciated that in an alternate embodiment of the flexible routing node 302 according to an embodiment of the present invention, the communication protocol implemented between the GMSC 348 and the flexible routing node 302 could be IP or another non-SS7 protocol, such as Asynchronous Transfer Mode (ATM) or Synchronous Optical Network (SONET). For instance, an IP communication link could just as effectively be used between the GMSC 348 and the flexible routing node 302. In such a case, a suitably configured DCM module would be substituted for the LIM 308 shown in FIG. 6. Likewise, the communication protocol implemented between the flexible routing node 302 and the HLR nodes 352, 354, and 356 could be SS7, Interim Standard-41 (IS-41), GSM or another non-IP protocol. For example, an SS7 communication link could be employed between the flexible routing node 302 and the HLR nodes 352, 354, and 356. In such a case, multiple LIM modules would be substituted for the DCM 336 shown in FIG. 6.

As stated above, one problem associated with load sharing and number porting among multiple HLR nodes is that conventional MSCs and GMSCs are only capable of block-based addressing. Similarly, a problem faced by many mobile operators is that SMSC addresses must be given to subscribers or programmed into subscriber handsets. If multiple SMSCs are used, it can become very difficult to manage this subscriber to SMSC mapping. As such, it will be appreciated that one of the primary objectives of the flexible routing node according to an embodiment of the present invention is to provide a method by which a network operator can quickly and easily direct signaling messages associated with a given calling or called party to a particular HLR or SMSC node. To facilitate such signaling message re-direction, the flexible routing node of the present invention employs a pair of complimenting routing databases which effectively map an IMSI or MSISDN number associated with a signaling message to the network address of the appropriate HLR or SMSC node. These databases, described above, are referred to as the G-FLEX™ database, and/or the GTT database.

FIGS. 9a and 9b are database structure diagrams which are intended primarily to illustrate the key or indexing structures of the G-FLEX™ and GTT databases 330 and 332, respectively. It should be appreciated that the G-FLEX™ and GTT database record structures and pseudo data presented in FIGS. 9a and 9b, while supportive of the examples shown in FIGS. 6 and 7, are merely illustrative of the basic information necessary to perform the required routing data lookups. In practice, the actual database record structures and overall database design may vary according to particular implementation requirements.

The complimentary database access scheme employed by the flexible routing node of the present invention requires that the GTT database 332 maintain a set of range or block-based routing rules while the G-FLEX™ database 330 contains exceptions to the block-based routing rules. Once again, this concept is generally illustrated in FIGS. 9a and 9b. By range or block-based routing rules, it is meant that a block or range of mobile identification numbers (IMSI, MSISDN, etc.) are associated with the network address of a particular HLR, EIR, AuC, Service Control Point (SCP), etc. Such a range-based routing rules database structure is similar to the routing database structures commonly employed in conventional GMSC nodes, as described above.

Referring to FIG. 9b, the GTT or range-based database 332 includes key fields in the left hand column and data fields in the right hand column. The key fields represent ranges of mobile identification numbers associated with a particular node. For example, the first key field specifies a minimum mobile identification number of 9199670000 and a maximum mobile identification number of 9199679999. The data fields corresponding to this range include a Point Code (PC) of 3-0-2, a Subsystem Number (SSN) of 6, and a Routing Indicator (RI) of RT-ON-SSN for the network element corresponding to the range in the key field. The data included in the data fields are merely illustrative of data fields that can be included in range-based or GTT database 332. Similar key fields and data fields are shown for other network elements.

Referring to FIG. 9a, the G-FLEX™ or exceptions-based database 330 contains entries that are exceptions to the entries in the range-based database 332. In FIG. 9a, the left-hand column includes key values for each entry, and the right hand column includes data fields for each entry. The first entry includes a key field value of 9193803833. The data fields corresponding to the first key field value include a point code (PC) of 3-0-3, a Subsystem Number (SSN) of 6, a Routing Indicator (RI) of RT-ON-SSN, a Replace Called party Global Title digits (RCGT) value of NO, and an Entity Address 303211234, representing HLR C. These data fields are merely illustrative of the data fields that can be included in the exception-based or G-FLEX™ database 330. The remaining entries in the database 330 contain similar data for other network elements.

The dual database architecture employed in the flexible routing node of the present invention provides a number of subtle benefits to the network operator. For example, the complimenting nature of the two databases optimally minimizes routing database memory resource requirements. Furthermore, the task of maintaining and administering the flexible routing node is greatly simplified, in that only exceptions to the conventional block-based routing rules must be explicitly entered in the G-FLEX™ database. If such were not the case and, for example, a particular network operator had data associated with 500,000 mobile subscribers stored in a one or more HLRs, the network operator would be required to create and store at least one unique routing record for each of the 500,000 subscribers. The exceptions-based structure of the flexible routing node database system simply requires, in such a case, that the operator create and store individual routing records in the G-FLEX™ database only for those IMSI or MSISDN numbers that do not adhere to the range or block-based rules that have been specified in the GTT database. For example, if a number is ported from one HLR to another HLR, the MSISDN number may be an exception to the block based rules in the second HLR. In the special case where all of the operator's IMSI or MSISDN numbers adhere to the block-based rules specified in the GTT database, the G-FLEX™ database would be empty. At the other extreme, where all of the operator's IMSI or MSISDN numbers do not adhere to the general block-based rules specified in the GTT database, the G-FLEX™ database would contain at least one entry for each of the operator's assigned mobile identification numbers.

The flexible routing node according to the present invention facilitates load sharing among HLRs. For example, if a service provider originally has two HLRs in service and subsequently purchases a third HLR, the G-FLEX™ database allows numbers allocated to the original HLRs to be re-allocated to the new HLR.

With regard to G-FLEX™ and GTT translation services, the parameters used either directly or indirectly to determine the type of translation service (e.g., G-FLEX™ service or GTT service) required by an incoming signaling message are included in FIGS. 10a–10c. The left-hand column in each of FIGS. 10a–10c represents the parameters used to determine the type of translation service required. In the illustrated figures, these parameters generally include a Routing Indicator (RI), Global Title Indicator (GTI) parameter, a Translation Type (TT) parameter, a Numbering Plan (NP) parameter, and a Nature of Address Indicator (NAI) parameter. These parameters, their meanings within the context of an SS7 communication network, and their range of values are well known to those skilled in the art and consequently will not be discussed in detail. It should suffice to say that the preferred embodiment of the flexible routing node of the present invention relies on some or all of these parameters to determine the required translation service.

The center column in each of FIGS. 10a–10c represents original values, i.e., before translation, for the parameters illustrated in each left hand column. The right-hand column in each of FIGS. 10a–10c illustrates the values for each of the parameters in the left-hand column after translation. More specifically, the right-hand column in FIG. 10a represents parameter values after a G-FLEX™ translation, which will be described with regard to FIG. 6. The right-hand column of FIG. 10b represents parameter values after a default global title translation, which will be described in detail with regard to FIG. 7. Finally, the right hand column of FIG. 10c represents parameter values after an intermediate global title translation, which will be described in detail with regard to FIG. 8.

Once the general type of translation service requirement has been made (i.e., G-FLEX™ translation or GTT translation), the specific type of translation service is next determined. With particular regard to G-FLEX™ translation services, the types of services available could include GSM services, such as HLR, SMSC, EIR, AuC, etc. Determination of the specific G-FLEX™ translation service is made through examination of a Subsystem Number (SSN) parameter that is contained in the Called Party Address (CdPA) field of the signaling message. Once again, the SSN parameter is well known to those skilled in the art and consequently will not be discussed in detail herein. It should suffice to say that the flexible routing node of the present invention is configured to recognize certain SSN values as indicating the need for a particular type of G-FLEX™ translation service.

From an operational standpoint, signaling messages requiring routing database processing are first serviced by the exception-based G-FLEX™ database. That is, a lookup is performed in the G-FLEX™ database based on either the IMSI or MSISDN number associated with the incoming signaling message packet. In the event that an IMSI or MSISDN match is located in the G-FLEX™ database, appropriate routing data is returned by the G-FLEX™ database and the signaling message packet is modified accordingly before further routing. No secondary search of the block-based GTT database is required in such a case. However, in the event that no IMSI or MSISDN match is located in the G-FLEX™ database, a secondary search is performed in the range-based GTT database.

G-FLEX™ Translation

FIGS. 6 and 7 generally illustrate the two routing database access scenarios briefly described above. More particularly, FIG. 6 diagrams the case where the initial G-FLEX™ database lookup finds an IMSI or MSISDN match and hence no secondary GTT database search is required. To illustrate this case, the path of a typical HLR-bound SS7 signaling message is traced from the GMSC 348, through the flexible routing node 302 and ultimately to the destination HLR C 356, with the path being indicated by a dashed line in FIG. 6. For the purposes of illustration, each of these network nodes has been assigned an SS7 network address or point code (PC). In both FIGS. 6 and 7, GMSC node 348 is identified by the PC 1-0-0, flexible routing node 302 is identified by PC 2-0-0, while the three HLR nodes 352, 354, and 356 are identified by the PCs 3-0-1, 3-0-2, and 3-0-3, respectively.

Beginning at the GMSC node 348, a signaling message is formulated and transmitted to the flexible routing node 302 via the SS7 communication link 320. The relevant data content of this originating signaling message is shown in FIG. 10a. As such, it will be appreciated from the table presented in FIG. 10a that the OPC of the original message is equal to 1-0-0, the PC of GMSC node 348. The DPC of the message is 2-0-0, the PC of the flexible routing node 302. The signaling message is received within the flexible routing node 302 by LIM 308. SS7 MTP Level 1 and 2 processing is performed on the incoming signaling message packet by the MTP Level 1 and 2 process 310. With MTP Level 1 and 2 processing complete, the signaling message packet is temporarily buffered in the I/O queue 312 before being passed up the stack to the MTP Level 3 HMDC process 314. The HMDC process 314 examines the signaling message packet and determines whether the packet requires further processing at the flexible routing node 302. In the example shown in FIG. 6, it is assumed that the HMDC process 314 determines that further processing of the signaling message packet is required, and the packet is subsequently passed to the HMDT process 316. The HMDT process 316 examines the packet and determines, based on the type of further processing that is required, which distributed processing module connected to the IMT bus 304 should next receive the packet. In this case, the HMDT process 316 determines that the signaling message should be forwarded to GDM module 322 for G-FLEX™ translation service. The signaling message packet is then placed on the high speed IMT bus 304 and sent to GDM 322. A detailed flow chart of GDM/SCCP related processing steps is presented in FIG. 11, and may be used in conjunction with the schematic diagram shown in FIG. 6 to better understand the G-FLEX™ and GTT database lookup methodology. Furthermore, FIG. 10a provides a summary of the contents of the signaling message packet before and after G-FLEX™ translation.

Figure 11:
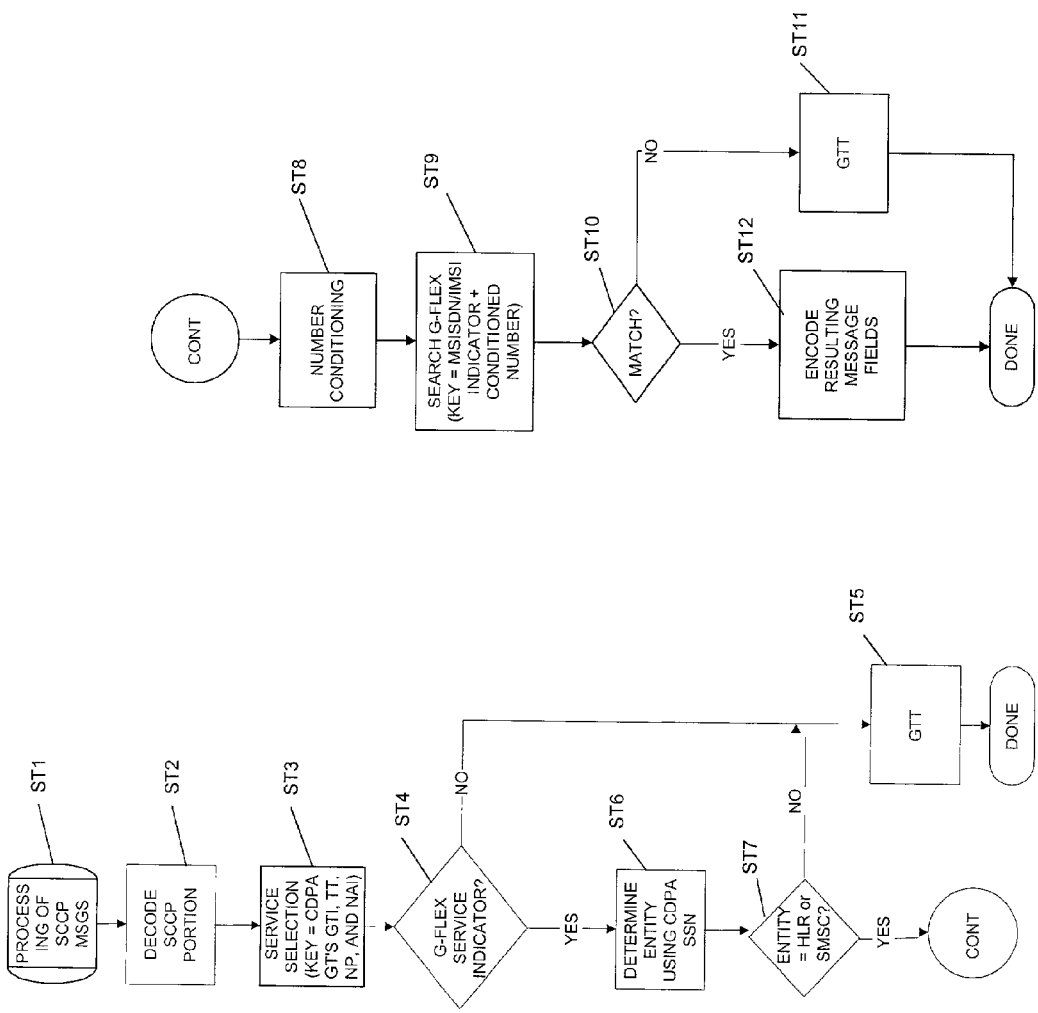
FIG. 11 is a flow diagram illustrating the translation process implemented by a flexible routing node of the present invention.

Referring to FIG. 11, in step ST1, the signaling message arrives at the GDM card 322 and SCCP process 326 receives the packet. Within SCCP process 326, the message packet is passed to the SCRC controller process 328. In steps ST2 and ST3, respectively, the SCRC process 328 decodes and examines packet content information contained within the signaling message header in order to establish which type of translation service is required. More particularly, the RI, GTI, TT, NP, and NAI parameters contained within the signaling message packet are analyzed to determine whether a G-FLEX™ or a GTT translation service is required. As indicated in steps ST4 and ST5, if it is determined that GTT translation service is required, the message is passed directly to the GTT database process 332. However, in the scenario presented in FIG. 6, an RI value of "RT-ON-GT", a GTI value of 4, a Translation Type (TT) value of 0, a "national" NAI value, and an "E.164" NP value, are collectively interpreted as indicating the need for a G-FLEX™ translation. The signaling message content is then further analyzed to determine the specific type of G-FLEX™ translation service required, as indicated by step ST6. More particularly, the CdPA SSN parameter is examined, and the value of 6 is interpreted as indicating the need for a G-FLEX™ HLR type translation. In this particular example, if the entity type of the destination node is determined to be anything other than HLR or SMSC (i.e., SSN not equal to 6 or 8), the packet is passed to the GTT database process 332 as shown in steps ST7 and ST5, respectively. In step ST8, the mobile identification number (MIN) encoded within the packet is subsequently examined and conditioned, as necessary. The MIN is typically stored within the CdPA field in a structure commonly referred to as the Global Title Digits (GTD) sub-field. In some cases, it may be necessary to retrieve the MIN from the TCAP/MAP information in the message. In this example, the MIN or GTD has a value of 9193803833, as shown in FIG. 10a, and it is further assumed that no conditioning of this number is required.

However, with regard to the above-mentioned number conditioning, such processing may be necessary to insure that the IMSI or MSISDN is compatible with the format of the key field data stored in the G-FLEX™ and GTT databases 330 and 332, respectively. Number conditioning operations might include the pre-pending extra digits to a mobile identification number contained within a signaling message packet so as to force the number to conform to an international format. Conversion of a mobile identification number from one numbering standard to another may also be performed. For instance, the mobile identification number associated with an incoming signaling message packet may be converted from a first industry standard format known as E.214 to a second industry standard format known as E.212 prior to database lookup operations. Once again, it should be appreciated that such mobile identification number conditioning services are necessary only in the case that the format of the incoming message mobile identification number is not consistent with the corresponding key field data format in the G-FLEX™ and GTT databases.

In step ST9, the G-FLEX™ database 330 is searched using the appropriate mobile identification number (IMSI or MSISDN) as at least a portion of the search key. If a match is not found in the G-FLEX™ database 330, the packet is passed to the GTT database 332 for processing, as shown in steps ST10 and ST11, respectively. However, in the example presented in FIG. 6, a match is found in the G-FLEX™ database 330, as indicated by the fact that there is an entry in the G-FLEX™ database 330 (FIG. 9a) corresponding to the message's CdPA SSN value of 9193803833. The routing data returned by the G-FLEX™ database process 330, a point code value of 3-0-3 and a subsystem number of 6, is subsequently encoded within the signaling message packet, as indicated by step ST12. It will be appreciated that the routing information, PC:3-0-3 SSN:6, returned by the G-FLEX™ database effectively constitutes the network address of HLR C 356. It should also be appreciated that the Routing Indicator (RI) field of the translated signaling message has been modified from the original "Route-On-GT" value to a new value of "Route-On-SSN", indicating that no further routing address translations are required to identify the network address of the destination HLR node. Once again, the Routing Indicator parameter is well known to those skilled in the art of SS7 telecommunications, and consequently a detailed discussion of this parameter and its routing functionality is not presented herein. It will be appreciated, however, that this parameter is used to generally indicate whether a signaling message packet requires SCCP type processing. It should also be noted in FIG. 9a that two of the stored data fields are not used in this case. An Entity Address field is used to store an alias, typically an MSISDN or IMSI formatted number, that is representative of a particular HLR or SMSC node. A Replace Called party Global Title digits (RCGT) field contains a flag that indicates whether the value in the CdPA:GTD field of the signaling message should be changed to reflect the Entity Address of the destination HLR node. In this case it will be appreciated that the RCGT flag is set to a value of "NO", indicating that the CdPA:GTD field of the signaling message need not be changed to reflect the Entity Address of HLR C. Such is typically the case, when the point code and subsystem information corresponding to the network address of a target HLR node is already known by the flexible routing node. If, however, the flexible routing node has not been provisioned with at least the point code corresponding to the destination HLR node, then an Entity Address substitution is employed to facilitate subsequent routing address translations by an external routing node. An example of such a scenario is provided below.

Returning now to FIG. 6, it will be appreciated that following the successful G-FLEX™ database lookup as described in detail above, the modified signaling message packet is next passed to the HMRT process 334. Once again, the HMRT process 334 determines to which LIM or DCM card the packet should be routed for subsequent transmission to the message's destination node. In this case, the HMRT process 334 determines that the link connecting the flexible routing node 302 and the modified message's destination node is located on DCM 336. Consequently, the modified signaling message packet is internally routed across the IMT bus 304 to DCM 336, where it is received by the HMCG process 340. HMCG process 340 passes the modified message packet into the I/O queue 341, while acknowledging this outbound packet's contribution to link congestion. Eventually, the modified message packet is passed from the I/O queue 341 and on to IP process 342, where the SS7 packet is encapsulated within an IP routing envelope. The IP encapsulated SS7 packet is then transmitted into the associated IP network 350 via the IP signaling link 344. In this example, the IP encapsulated SS7 packet is addressed and consequently routed through the IP network 350 to the final destination, HLR C 356. The OPC of the packet is changed to the OPC of flexible routing node 302.

Default GTT Translation

Turning now to FIG. 7, the example message flow scenario presented in this diagram illustrates the case where an initial G-FLEX™ database lookup fails to find an IMSI or MSISDN match and hence a secondary or default GTT database search is required. The path of a typical HLR-bound SS7 signaling message is traced from the GMSC 348, through the flexible routing node 302 and ultimately to the destination HLR B 354. Once again, the signaling message pathway is indicated by a dashed line. Beginning at the GMSC node 348, a signaling message is formulated and transmitted to the flexible routing node 302 via the SS7 communication link 320. The relevant data content of this originating signaling message is shown in FIG. 10b. As such, it will be appreciated from the table presented in FIG. 10b that the OPC of the original message is equal to 1-0-0, the PC of GMSC node 348. The DPC of the message is 2-0-0, the PC of the flexible routing node 302.

As processing of the incoming signaling message packet on the LIM 308 in this scenario is identical to that described for the scenario illustrated in FIG. 6 and described above, a detailed discussion of LIM processing will not be repeated. Instead, it will be appreciated that the incoming signaling message is received within the flexible routing node 302 by LIM 308 and that the message packet is subsequently examined and routed via IMT bus 304 to GDM card 322 for further processing.

The detailed flow chart of GDM/SCCP related processing steps presented in FIG. 11 can be used in conjunction with the schematic diagram shown in FIG. 7 to better understand the G-FLEX™ and GTT database lookup methodology. Furthermore, FIG. 10b provides a summary of the contents of the signaling message packet before and after G-FLEX™ translation. Referring to FIG. 11, in step ST1, the signaling message arrives at the GDM card 322 and SCCP process 326 receives the packet. Within SCCP process 326, the message packet is passed to the SCRC controller process 328. In steps ST2 and ST3, respectively, the SCRC process 328 decodes and examines packet content information contained within the signaling message header in order to establish which type of translation service is required. More particularly, the RI, GTI, TT, NP, and NAI parameters contained within the signaling message packet are analyzed to determine whether a G-FLEX™ or a GTT translation service is required. Once again, as in the preceding example, a RI value of "RT-ON-GT", a GTI value of 4, a TT value of 0, a "national" NAI value, and an "E.164" NP value, are collectively interpreted as indicating the need for a G-FLEX™ translation. The signaling message content is then further analyzed to determine the specific type of G-FLEX™ translation service required, as indicated by step ST6. More particularly, the CdPA SSN parameter is examined, and the value of 6 is interpreted as indicating the need for a G-FLEX™ HLR type translation. In step ST8, the mobile identification number (MIN) encoded within the packet is subsequently examined and conditioned, as necessary. In this example, the MIN or GTD has a value of 7707883438, as shown in FIG. 10b, and it is further assumed that no conditioning of this number is required.

In step ST9, the G-FLEX™ database 330 is searched using the appropriate mobile identification number (IMSI or MSISDN) as at least a portion of the search key. In this case, a match is not found in the G-FLEX™ database 330 and the packet is passed to the GTT database 332 for further processing, as shown in step ST10. It will be appreciated that this GTT default processing is indicated by the fact that there is not an entry in the G-FLEX™ database 330 (FIG. 9a) corresponding to the message's CdPA SSN value of 7707883438. Consequently, in step ST10, the GTT database 332 is searched using the mobile identification number, 7707883438, as at least a portion of the search key. As indicated in FIG. 9b, a MIN range is defined in the GTT database 332 which bounds the searched MIN, 7707883438. The routing data returned by the GTT database process 332, a point code value of 3-0-2 and a subsystem number of 6, is subsequently encoded within the signaling message packet, as indicated by step ST12. It will be appreciated that the routing information, PC:3-0-2 SSN:6, returned by the GTT database 332 effectively constitutes the network address of HLR B 354. It should also be appreciated that the Routing Indicator (RI) field of the translated signaling message has been modified from the original "Route-On-GT" value to a new value of "Route-On-SSN".

Returning now to FIG. 7, it will be appreciated that following the unsuccessful G-FLEX™ and successful GTT database lookup sequence as described in detail above, the modified signaling message packet is next passed to the HMRT process 334. Once again, the HMRT process 334 determines to which LIM or DCM card the packet should be routed for subsequent transmission to the message's destination node. In this case, the HMRT process 334 determines that the link connecting the flexible routing node 302 and the modified message's destination node is located on DCM 336. Consequently, the modified signaling message packet is internally routed across the IMT bus 304 to DCM 336, where it is received by the HMCG process 340. HMCG process 340 passes the modified message packet into the I/O queue 341, while acknowledging this outbound packet's contribution to link congestion. Eventually, the modified message packet is passed from the I/O queue 341 and on to IP process 342, where the SS7 packet is encapsulated within an IP routing envelope. The destination IP address in the routing envelop can be determined by database lookup in the DCM for the IP address corresponding to point code 3-0-2. The IP encapsulated SS7 packet is then transmitted into the associated IP network 350 via the IP signaling link 344. In this example, the IP encapsulated SS7 packet is addressed and consequently routed through the IP network 350 to the final destination, HLR B 354.

As stated above, the IP network 350 illustrated in FIG. 7 may be replaced by an SS7 network without departing from the scope of the invention. In such a scenario, the DCM 336 can be replaced by a second LIM for routing outgoing SS7 messages over an SS7 network. In a method for routing a signaling message according to such an embodiment, the steps for routing the signaling message are the same as those described above prior to distribution of the message to the DCM 336, as described above. However, when the DCM 336 is replaced by a LIM, rather than encapsulating the signaling message in an IP packet, the signaling message is simply routed to HLR B 354 according to the destination point code of the message. The outgoing signaling message has an OPC equal to the point code of flexible routing node 302 and a DPC equal to the point code of HLR B 354. Because the OPC of the signaling message is changed to the point code of flexible routing node 302, rather than that of the GMSC 348, compliance with SS7 network reliability procedures is maintained.

Intermediate Translation

Figure 8:
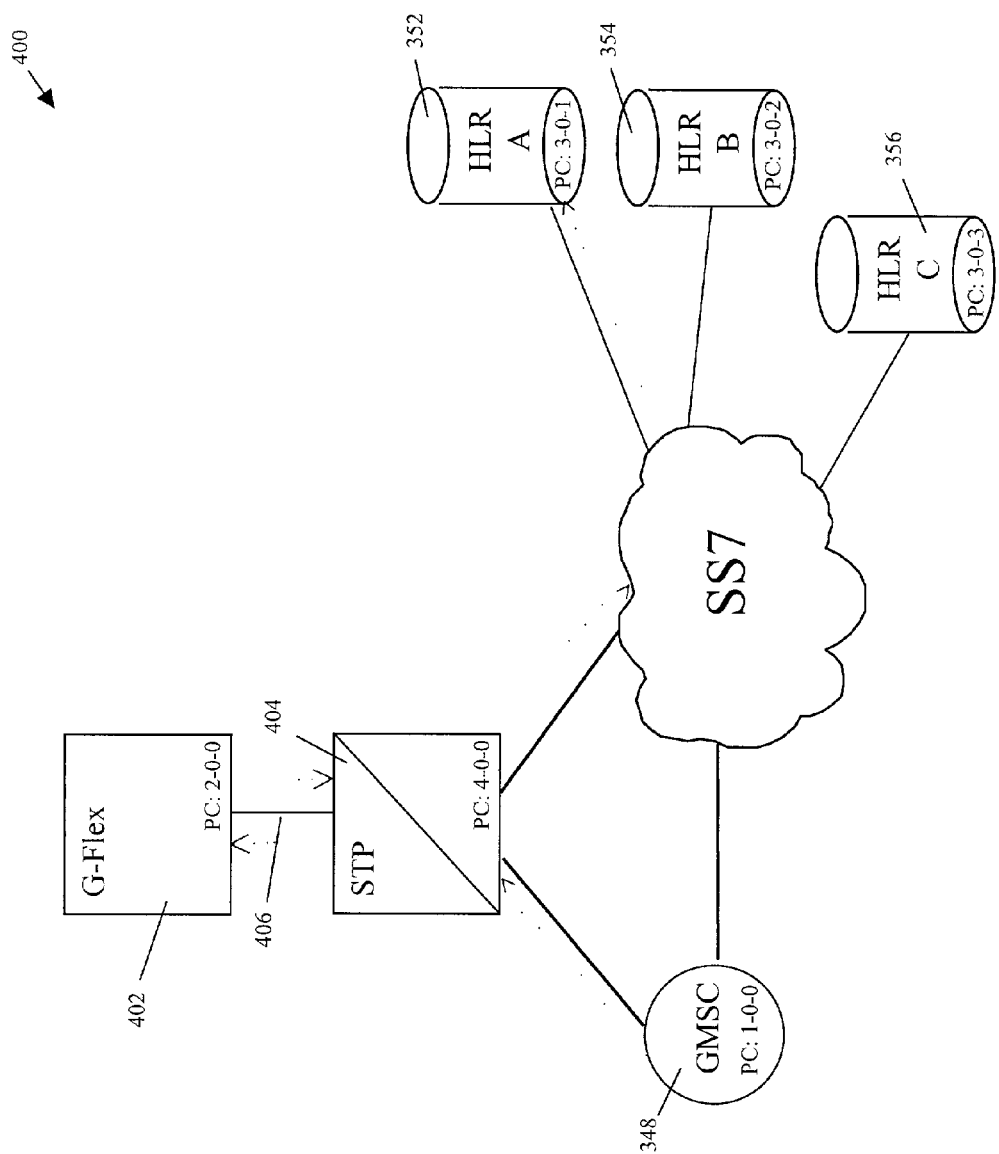
FIG. 8 is a schematic network diagram illustrating an alternate network implementation of a flexible routing node of the present invention.

Another example, presented in FIG. 8, is intended to illustrate an alternate network implementation in which it is possible for a flexible routing node of the present invention to provide an intermediate routing translation. In this implementation, signaling network 400 includes a flexible routing node 402, which is substantially identical in form and function to the flexible routing node 302 described above and generally illustrated in FIGS. 6 and 7. Flexible routing node 402 is coupled to GMSC 348 and the three HLR nodes 352, 354, and 356 via at least one intermediate STP 404. The communication link 406 between flexible routing node 402 and STP 404 is an SS7 link, although other communication protocols, such as IP, could also be employed.

In this scenario, the path of a typical HLR-bound SS7 signaling message is traced from the GMSC 348, through the flexible routing node 402 and ultimately to the destination node, HLR A 352. Once again, the signaling message pathway is indicated by a dashed line. The relevant data content of this signaling message as it is first received and then translated by the flexible routing node 402 is shown in FIG. 10c. Beginning at the GMSC node 348, a signaling message with a CdPA:GTD value of 2125662322 is formulated and transmitted to the intermediate STP 404. STP 404 receives and routes the signaling message on to the flexible routing node 402 via communication link 406. Although not shown in FIG. 10c, it will be appreciated that the OPC of the original message is equal to 1-0-0, the PC of GMSC node 348, while the DPC of the original message is 4-0-0, the PC of the STP 404. In the process of routing the message packet, STP 404 modifies the OPC to 4-0-0 and the DPC to 2-0-0. The message is then transmitted by STP 404 to the flexible routing node 402, which is assigned the point code 2-0-0. Once the signaling message is received by the flexible routing node 402, processing of the message is essentially the same as that described above for the previous examples.

The only significant difference in this case is that the routing data returned by the G-FLEX™ database lookup is not the point code and SSN of the target HLR A node 352, but is instead the Entity Address associated with HLR A 352 and the point code of STP 404. More particularly, a Replace Called party Global Title digits (RCGT) value of "YES" is returned by the G-FLEX™ database as indicated in FIG. 9a, along with an HLR A Entity Address value of 1013211234. Consequently, the original value of the CdPA:GTD field of the signaling message, 2125662322, is replaced by the HLR A Entity Address value of 1013211234.

A second key distinction from the previous example scenarios is that the CdPA routing indicator of the translated message is set to "RT-ON-GT" instead of "RT-ON-SSN", thereby indicating that a least one more routing address translation will be required to determine the actual network address of the destination HLR node.

Those skilled in the art of SS7 routing systems will appreciate that such a translation is very similar in form and function to an intermediate global title translation. As such, it is implied that the G-FLEX™ and GTT databases contained within flexible routing node 402 do not have the information necessary to identify the actual network address of the target destination node. However, the G-FLEX™ database is populated with information relating to the next network routing node that might have the actual network address of the target destination node. As indicated in FIGS. 8, 9a and 10c, the result of the G-FLEX™ database lookup indicates that the signaling message packet should be next routed to STP 404 at PC: 4-0-0. Furthermore, the routing indicator of the translated message is set to a value of "RT-ON-GT", indicating that a final routing translation is still required before the message packet can reach it's target destination. In this example, it is assumed that STP 404 is configured to perform a successful final GTT on the message packet using the Entity Address of HLR A that has been stored in the CdPA:GTD field of the signaling message. Following this final GTT translation at STP 404, the DPC of the message packet is changed to 3-0-1:6, and the message is subsequently transmitted to the network element corresponding to this PC and SSN, namely HLR A 352. The OPC of the message is changed to 4-0-0, that is, the OPC of the STP 404.

As alluded to previously, one significant distinction that the flexible routing node of the present invention has over prior art solutions involves the manner in which the OPC field of the SS7 MTP routing label is altered during the G-FLEX™ or GTT translation process. More particularly, as part of the G-FLEX™ and GTT processing, the OPC of the translated signaling message is modified to reflect the point code of the flexible routing node. This distinction is significant in that it enables industry standard SS7 level 3 and above network management protocols to operate in compliance with accepted SS7 telecommunications standards as defined by ANSI, ITU, Telcordia, and others.

SMS Message Routing

As stated above, one problem in conventional mobile communications networks is assigning existing mobile subscribers to new SMSCs as new SMSCs are added to a network. This problem stems from the fact that the entity address for the SMSC is either hard coded or programmed into the subscribers' handsets. If new SMSCs are added, the subscribers' handsets must either be reprogrammed or an alternate SS7 message routing scheme must be implemented. The flexible routing node according to an embodiment of the present invention includes functionality for routing messages to a specific SMSC in a network that includes multiple SMSCs without requiring the reprogramming of mobile handsets.

Figure 12:
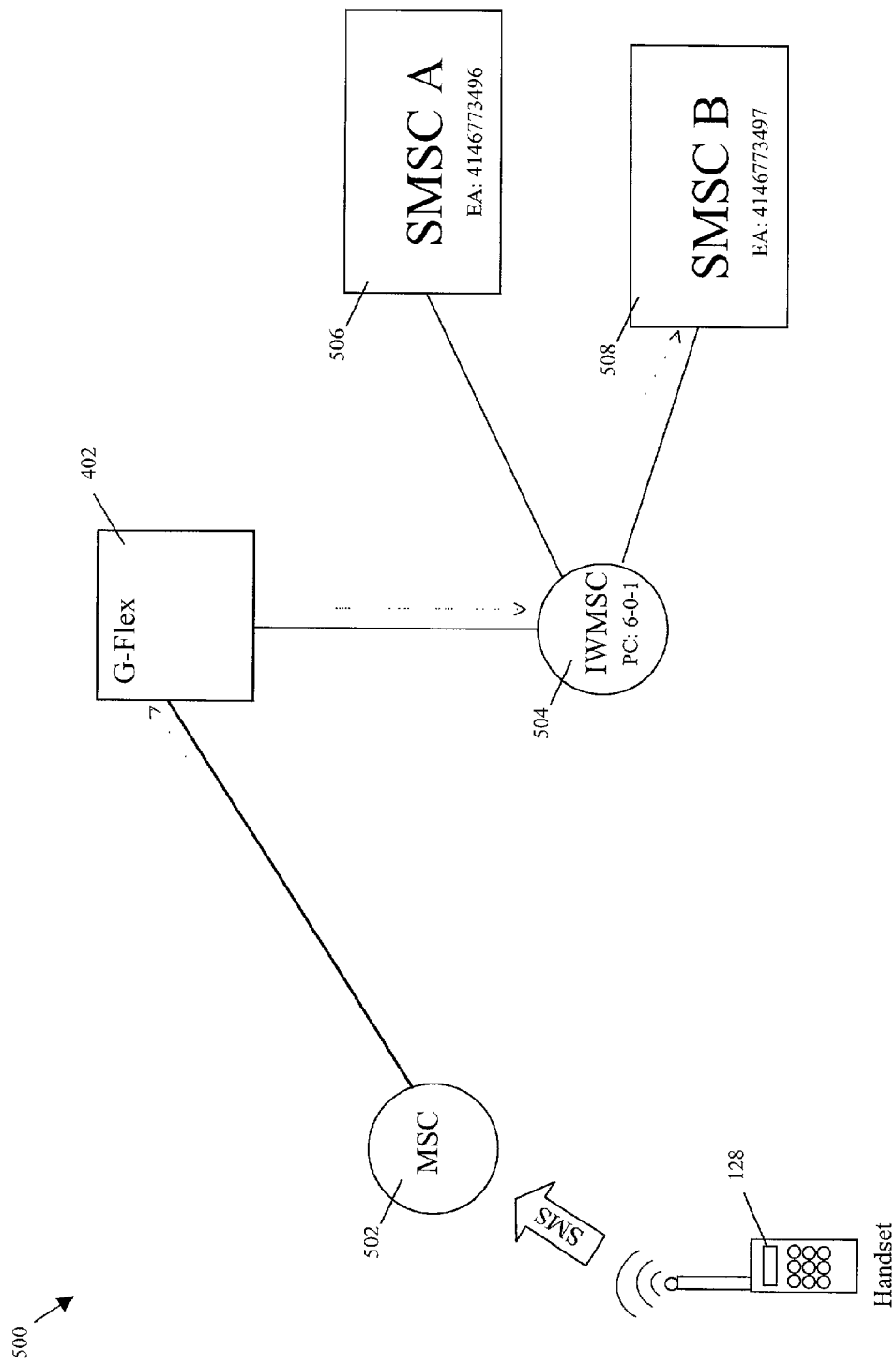
FIG. 12 is a network diagram illustrating the routing of short message service messages according to an embodiment of the present invention.

FIG. 12 is a network diagram illustrating a network that includes multiple SMSCs. Referring to FIG. 12, network 500 includes flexible routing node 402, MSC 502, IWMSC 504, SMSC A 506 and SMSC B 508. Flexible routing node 402 includes exceptions and range-based databases as illustrated in FIGS. 9a and 9b, respectively. However, unlike the examples described above which relate primarily to routing messages to HLRs, an example will now be described in which flexible routing node 402 routes messages to SMSCs 506 and 508.

When a user desires to send a short message to another user, mobile handset 128 sends the data and the mobile identification number of the intended recipient to MSC 502. MSC 502 receives the data from the handset and sends a short message service message to flexible routing node 402. The short message service message includes a mobile application part (MAP) portion including the mobile identification number of originating handset 128. The short message service message may also include the entity address of the SMSC that was originally programmed into handset 128. However, rather than using this entity address, which is stored in the SCCP portion of the message, flexible routing node 402 uses the MIN in the MAP portion of the message to decide whether to route the message to SMSC A 506 or SMSC B 508.

When flexible routing node 402 receives the short message service message from MSC 502, the message is identified as an SCCP message that requires G-FLEX processing in the manner described above, i.e., based on the service selector, translation type, numbering plan, and nature of address indicator parameters in the message. In addition to these parameters, the subsystem number parameter is examined to determine the entity type of the node to which the message should be routed. This SSN-to-entity type mapping may be performed by SCRC process 328 using an entity type table provisioned on GDM 322 illustrated in FIG. 7. An example of such an entity type table is as follows:

TABLE 1

SSN to Entity Type Mapping

| Subsystem Number | Entity Type |
|---|---|
| 6 | HLR |
| 8 | SMSC |

Referring to FIG. 9a, once the message is identified as having an entity type of SMSC, a lookup is performed in exceptions-based database 330 using the MIN from the MAP portion of the message. In FIG. 9a, if the MIN in the MAP portion of the message is 4143286672, the destination entity address for the message is 4146773497, which corresponds to SMSC B 508. Flexible routing node 402 inserts the entity address of SMSC B 508 in the called party address field of the message, inserts the point code 6-0-1 in the DPC field in the MTP part of the message, and routes the message to IWMSC 504 illustrated in FIG. 12. IWMSC 504 routes the message to SMSC B 508. SMSC B 508 receives the short message service message and sends a short message service message to the destination mobile handset.

If the lookup in exceptions-based database 330 using the MIN from the MAP portion of the message fails. A lookup occurs in range-based database 332 using the entity address in the called party address field of the SCCP portion of the message. In this case, the message would be routed to an SMSC based on the entity address for that SMSC in database 332.

Thus, flexible routing node 402 illustrated in FIG. 12 allows short message service messages to be routed to an SMSC in a network that includes multiple SMSCs. This routing can be performed without requiring the mobile handsets of a mobile telecommunications service provider to be changed when a new SMSC is added to the network. Thus, the flexible routing node according to the present embodiment greatly reduces the burden on mobile telecommunications service providers when adding new SMSCs to a network.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for routing message to a short message service center (SMSC) in a network including a plurality of SMSCs, the method comprising:
    (a) receiving a message having a signaling connection control part and a mobile application part, the mobile application part having a mobile identification number (MIN) of an originating handset;
    (b) determining an entity type for the message based on the signaling connection control part;
    (c) in response to determining that the entity type indicates that the message is destined for an SMSC, performing a lookup in an address translation database using the MIN of the originating handset from the mobile application part of the message to locate an address for one of the SMSCs in the network, wherein performing a lookup in an address translation database using the MIN of the originating handset includes performing, using the MIN of the originating handset, a lookup in an exception-based database containing first packet routing rule records and, in response to failing to locate an address in the exception-based database, the method further comprises performing a lookup in a range-based database containing second packet routing rule records, wherein the first packet routing rule records represent packet routing rules that are exceptions to packet routing rules represented by the second packet routing rule records; and
    (d) in response to locating the address, routing the message based on the address.

2. The method of claim 1 wherein at least one of the first packet routing rule records in the exception-based database is indexed by a single mobile identification number.

3. The method of claim 1 wherein at least one of the second packet routing rule records in the range-based database is indexed by a range or block of mobile identification numbers.

4. The method of claim 1 wherein, performing a lookup in the range-based database includes performing the lookup using an entity address extracted from the signaling connection control part of the message.

5. The method of claim 4 wherein the entity address extracted from the signaling connection control part of the message corresponds to an entity address programmed into the originating handset.

6. The method of claim 1 wherein receiving a message includes receiving a short message service message from a mobile switching center.

7. The method of claim 6 wherein receiving a short message service message includes receiving a short message service message at a signal transfer point or signaling gateway.

8. The method of claim 1 wherein routing the message based on the address includes routing the message to an interworking mobile switching center (IWMSC) associated with the one SMSC.

9. The method of claim 1 wherein at least one of the first packet routing rule records in the exception-based database is indexed by a mobile identification number that is outside of a mobile identification number range by which at least one of the second packet routing rule records in the range-based database is indexed.

10. The method of claim 1 comprising, in response to locating the address, inserting an entity address of a destination SMSC in the called party address field of the message.

11. A flexible routing node comprising:
    (a) a communication module for receiving signaling messages, determining whether the messages require signaling connection control part (SCCP) processing, and, in response to determining that the messages require SCCP processing, internally routing the messages; and
    (b) a processing module for receiving the signaling messages that require SCCP processing, extracting mobile identification numbers of originating handsets from mobile application part portions of the messages, and performing address translations for the messages based on the mobile identification numbers of the originating handsets, wherein the processing module includes a range-based database having first packet routing rule records and an exception-based database having second packet routing rule records representing exceptions to packet routing rules represented by the first packet routing rule records and wherein, in performing each of the address translations, the processing module is adapted to perform a lookup in at least one of the range-based and exception-based databases.

12. The flexible routing node of claim 11 wherein the processing module includes an entity type table for determining an entity type for the signaling messages that require SCCP processing.

13. The flexible routing node of claim 12 wherein the entity type table includes entries for mapping subsystem number values to entity type identifiers.

14. The flexible routing node of claim 13 wherein the entity type table includes a first entry for mapping a subsystem number value to an SMSC entity type.

15. The flexible routing node of claim 14 wherein the first entry maps the subsystem number value of 8 to an SMSC entity type.

16. The flexible routing node of claim 14 wherein the processing module is adapted to perform the address translations based on the mobile identification numbers of the originating handsets extracted from the MAP portions of the messages for messages having an entity type of SMSC.

17. The flexible routing node of claim 11 wherein the signaling messages that require SCCP processing include at least one short message service message and wherein the processing module is adapted to route the at least one short message service message to a short message service center corresponding to the mobile identification number of the originating handset extracted from the mobile application part portion of the at least one short message service message.

18. The flexible routing node of claim 11 wherein at least at least some of the second packet routing rule records are indexed by individual mobile identification numbers, and wherein at least some of the first packet routing rule records database are indexed by ranges of mobile identification numbers, and wherein the processing module is adapted to perform a lookup in the exception-based database using the mobile identification number of the originating handset from a MAP portion of one of the messages that require SCCP processing, and in response to failing to locate a matching entry in the exception-based database, the processing module is adapted to perform a lookup in the range-based database using an SMSC entity address extracted from an SCCP portion of the one message.

19. The flexible routing node of claim 18 wherein at least one of the second packet routing rule records in the exception-based database is indexed by a mobile identification number that is outside of mobile identification number ranges by which the first packet routing rule records in the range-based database are indexed.

20. The flexible routing node of claim 11 wherein the communication module and the processing module are components of a signal transfer point (STP).

21. The flexible routing node of claim 11 wherein, in performing each address translation, the processing module is adapted to write an entity address of a destination short message service center in a called party address field of each message.

22. A network element for routing a data packet through a communications network, the network element comprising:

(a) a communication module capable of transmitting a data packet to and receiving the data packet from a communications network;

(b) a range-based database containing first packet routing rule records, wherein each first packet routing rule record is indexed by a range or block of identification numbers; and (c) an exception-based database containing second packet routing rule records wherein each second packet routing rule record is indexed by a single identification number, wherein at least one of the second packet routing rule records is indexed by a single identification number that is outside of the ranges or blocks of identification numbers by which the first packet routing rule records are indexed, wherein the network element is adapted to perform a lookup in the exception-based database using a mobile identification number (MIN) extracted from a mobile application part (MAP) of a signaling message, and, in response to failing to locate a matching record, the network element is adapted to perform a lookup in the range-based database using an entity address extracted from a signaling connection control part (SCCP) of the signaling message.

23. The network element of claim 22 wherein the MIN comprises a MIN of an originating handset.

24. A method for routing short message service (SMS) messages, the method comprising:

(a) receiving an SMS message from a mobile switching center, the SMS message having a signaling connection control part (SCCP) including a called party address field storing an entity address of a first short message service center (SMSC) and a mobile application part (MAP) storing a mobile identification number (MIN);

(b) performing a first lookup based on the MIN extracted from the MAP of the SMS message;

(c) in response to locating a matching entry in the first lookup, extracting an entity address associated with a second SMSC from the matching entry, inserting the entity address associated with the second SMSC in the SCCP called party address field of the SMS message and, routing the SMS message to the second SMSC using routing information from the matching entry;

(d) in response to failing to locate a matching entry in the first lookup, performing a second lookup using the SMSC entity address of the first SMSC stored in the SCCP called party address field of the SMS message; and (e) in response to locating a matching entry in the second lookup, routing the SMS message to the first SMSC.

25. The network element of claim 24 wherein the MIN comprises a MIN of an originating handset.

* * * * *